United States Patent
Jang

(10) Patent No.: US 10,168,824 B2
(45) Date of Patent: Jan. 1, 2019

(54) ELECTRONIC DEVICE AND CONTROL METHOD FOR THE ELECTRONIC DEVICE

(71) Applicant: LG ELECTRONICS INC., Seoul (KR)

(72) Inventor: Suhyung Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 66 days.

(21) Appl. No.: 15/105,822

(22) PCT Filed: Nov. 19, 2015

(86) PCT No.: PCT/KR2015/012479
§ 371 (c)(1),
(2) Date: Jun. 17, 2016

(87) PCT Pub. No.: WO2016/085198
PCT Pub. Date: Jun. 2, 2016

(65) Prior Publication Data
US 2017/0300162 A1    Oct. 19, 2017

(30) Foreign Application Priority Data

Nov. 26, 2014   (KR) .......................... 10-2014-0166699

(51) Int. Cl.
*G06F 3/01*   (2006.01)
*B60K 35/00*  (2006.01)
(Continued)

(52) U.S. Cl.
CPC ............ *G06F 3/0416* (2013.01); *B60K 35/00* (2013.01); *B60K 37/00* (2013.01); *G06F 3/013* (2013.01); *G06F 3/1423* (2013.01); *G06K 9/00838* (2013.01); *G06K 9/00845* (2013.01); *G09G 5/14* (2013.01); *G06F 3/0482* (2013.01);
(Continued)

(58) Field of Classification Search
CPC .. G06F 3/0416; G06F 3/1423; G06F 3/04886; G06F 3/0482; G06F 3/013; G06K 9/00838; G06K 9/00845; G09G 5/14; G09G 2354/00; G09G 2380/10
See application file for complete search history.

(56) References Cited

U.S. PATENT DOCUMENTS

| | | | |
|---|---|---|---|
| 2005/0199209 A1* | 9/2005 | Shimokawa | F02N 11/0822 123/179.4 |
| 2005/0280524 A1* | 12/2005 | Boone | B60K 35/00 340/461 |

(Continued)

FOREIGN PATENT DOCUMENTS

| | | |
|---|---|---|
| EP | 2 544 072 A2 | 1/2013 |
| JP | 2001-307298 A | 11/2001 |

(Continued)

*Primary Examiner* — Ibrahim A Khan
(74) *Attorney, Agent, or Firm* — Birch, Stewart, Kolasch & Birch, LLP

(57) ABSTRACT

An electronic device provided in a vehicle and including a touch screen; a first camera configured to capture an image of a driver of the vehicle; and a controller configured to restrict a touch input function with respect to the touch screen in response to an eyeline of the driver included in the image being out of a preset driving range for more than a predetermined time.

19 Claims, 18 Drawing Sheets

(51) Int. Cl.
  *G06F 3/041* (2006.01)
  *G06F 3/14* (2006.01)
  *G06K 9/00* (2006.01)
  *G09G 5/14* (2006.01)
  *B60K 37/00* (2006.01)
  *G06F 3/0482* (2013.01)
  *G06F 3/0488* (2013.01)

(52) U.S. Cl.
  CPC ..... *G06F 3/04886* (2013.01); *G09G 2354/00* (2013.01); *G09G 2380/10* (2013.01)

(56) References Cited

U.S. PATENT DOCUMENTS

| | | | |
|---|---|---|---|
| 2013/0009759 A1* | 1/2013 | Kinoshita | B60K 35/00 340/425.5 |
| 2013/0190044 A1 | 7/2013 | Kulas | |
| 2013/0300872 A1 | 11/2013 | Park | |
| 2013/0307771 A1 | 11/2013 | Parker et al. | |
| 2014/0028542 A1* | 1/2014 | Lovitt | G06F 3/017 345/156 |
| 2016/0009175 A1* | 1/2016 | McNew | H04N 13/0484 340/438 |

FOREIGN PATENT DOCUMENTS

| | | | |
|---|---|---|---|
| JP | 2009-227246 A | 10/2009 | |
| JP | 2013-020334 A | 1/2013 | |
| JP | 2013-541915 A | 11/2013 | |

\* cited by examiner

ELECTRONIC DEVICE AND CONTROL METHOD FOR THE ELECTRONIC DEVICE

This application is the National Phase of PCT International Application No. PCT/KR2015/012479, filed on Nov. 19, 2015, which claims priority under 35 U.S.C. 119(a) to Patent Application No. 10-2014-0166699, filed in Korea on Nov. 26, 2014, all of which are hereby expressly incorporated by reference into the present application.

TECHNICAL FIELD

The present invention relates to an electronic device having a touch screen, and a method for controlling the same.

BACKGROUND ART

As the information age develops rapidly, a function to input and output information to/from an electronic device, and a function to store data become important. An electronic device provided with such functions may be classified into a portable electronic device such as a mobile terminal, and a stationary electronic device such as a refrigerator.

Such electronic devices have become increasingly more functional. Examples of such functions include data and voice communications, capturing images and video via a camera, recording audio, playing music files via a speaker system, and displaying images and video on a display. Some electronic devices include additional functionality which supports game playing, while other electronic devices are configured as multimedia players. More recently, electronic devices have been configured to receive broadcast and multicast signals which permit viewing of content such as videos and television programs. Further, electronic devices provide information on a desired place and a moving path, using GPS wireless signals.

Recently, such an electronic device having various functions is provided in a vehicle, and a driver may execute various functions using the electronic device provided in the vehicle. However, as the electronic device becomes multi-functional, an eyeline of the driver may not be toward the front side. This may cause an accident rate to be increased.

DISCLOSURE OF THE INVENTION

Therefore, an object of the present invention is to provide an electronic device capable of controlling a touch screen based on a driver's eyeline, and a control method thereof.

Another object of the present invention is to provide an electronic device capable of providing various information using a touch screen such that a driver's eyeline is toward the front side, and a control method thereof.

To achieve these and other advantages and in accordance with the purpose of the present invention, as embodied and broadly described herein, there is provided an electronic device provided in a vehicle, the electronic device including: a touch screen; a camera configured to capture a driver; and a controller configured to detect a driver's eyeline based on an image received through the camera, and configured to control a preset function to be executed on the touch screen, if the driver's eyeline is out of a preset range for more than a predetermined time. The controller restricts an input function with respect to the touch screen if the driver's eyeline is out of the preset range for more than the predetermined time.

In an embodiment of the present invention, the preset function may be executed in an assumption that the vehicle is running.

In an embodiment of the present invention, a time duration for which the driver's eyeline is out of the preset range, may be measured from a time point when a touch input has been applied to the touch screen.

In an embodiment of the present invention, if the driver's eyeline is out of the preset range for more than the predetermined time, the controller may restrict an input function with respect to the touch screen.

In an embodiment of the present invention, if an input function with respect to the touch screen is restricted, a voice or information inducing usage of a user input unit may be output to the touch screen.

In an embodiment of the present invention, the controller may execute a different function according to a time duration for which the driver's eyeline is out of the preset range.

In an embodiment of the present invention, the controller may convert first screen information output to the touch screen into second screen information different from the first screen information if the driver's eyeline is out of the preset range for a first time, and may restrict an input function with respect to the touch screen if the driver's eyeline is out of the preset range for a second time longer than the first time.

In an embodiment of the present invention, the second screen information may be formed as selection for at least part of information included in the first screen is restricted.

In an embodiment of the present invention, if the driver's eyeline is out of the preset range for the second time, the controller may output notification information indicating restriction of an input function with respect to the touch screen.

In an embodiment of the present invention, if the driver's eyeline is out of the preset range for a third time longer than the second time, the controller may turn off the touch screen.

In an embodiment of the present invention, the electronic device may further include a camera formed to be toward a front side of the vehicle. If the driver's eyeline is out of the preset range for the third time, the controller may not turn off the touch screen, but may output an image received through the camera formed to be toward the front side of the vehicle, to the touch screen.

In an embodiment of the present invention, the electronic device may further include a display unit formed on a different position from the touch screen. If the driver's eyeline is out of the preset range for more than the predetermined time, the controller may output screen information output to the touch screen, to the display unit.

In an embodiment of the present invention, if it is determined that the driver's eyeline is toward the touch screen for more than the predetermined time in a driving state of the vehicle, the controller may turn off the touch screen.

To achieve these and other advantages and in accordance with the purpose of the present invention, as embodied and broadly described herein, there is also provided a method of controlling an electronic device provided in a vehicle, the method including: detecting a driver's eyeline based on an image received through a camera; and controlling a preset function to be executed on a touch screen, if the driver's eyeline is out of a preset range for more than a predetermined time.

In an embodiment of the present invention, the preset function may be executed in an assumption that the vehicle is running.

In an embodiment of the present invention, a time duration for which the driver's eyeline is out of the preset range, may be measured from a time point when a touch input has been applied to the touch screen.

In an embodiment of the present invention, in the controlling, if the driver's eyeline is out of the preset range for more than the predetermined time, an input function with respect to the touch screen may be restricted.

In an embodiment of the present invention, the touch screen may include a plurality of touch screens. If the driver's eyeline is out of the preset range for more than the predetermined time, the controller may control screen information being output to the plurality of touch screens to disappear. The screen information being output to the plurality of touch screens may disappear as a different time lapses.

In an embodiment of the present invention, the plurality of touch screens may include a first touch screen, and a second touch screen different from the first touch screen. A distance between the driver and the first touch screen may be shorter than a distance between the driver and the second touch screen. If the driver's eyeline is out of the preset range for more than a first time, the controller may control screen information being output to the second touch screen to disappear, and may control screen information being output to the first touch screen to be maintained. The screen information being output to the first touch screen may disappear when the driver's eyeline is out of the preset range for more than a second time longer than the first time.

In an embodiment of the present invention, the camera may be configured to capture a user as well as the driver. If it is determined that the user not the driver is applying a touch input to one of the plurality of touch screens, based on an image received through the camera, the controller may control the screen information being output to the one touch screen to be output continuously without disappearing.

In an embodiment of the present invention, an input function with respect to the one touch screen may be maintained without being restricted, if it is determined that the user not the driver is applying a touch input to the one touch screen.

In an embodiment of the present invention, the camera may be configured to capture a user as well as the driver. The controller may detect an eyeline of the user as well as the driver's eyeline, based on an image received through the camera. If it is determined that both the driver's eyeline and the user's eyeline are toward the touch screen for more than a predetermined time, the controller may control a specific function to be executed on the touch screen.

In an embodiment of the present invention, if it is determined that both the driver's eyeline and the user's eyeline are toward the touch screen for more than the predetermined time, the controller may output, to the touch screen, notification information inducing the driver to stare at the preset range.

In an embodiment of the present invention, if it is determined that both the driver's eyeline and the user's eyeline are toward the touch screen for more than the predetermined time, the controller may change an output type of screen information being output to the touch screen, such that the touch screen may be manipulated by the user not the driver.

In an embodiment of the present invention, a plurality of selectable menu items may be output to the touch screen, and each of the plurality of menu items may be formed to have a preset depth. As a time duration for which the driver's eyeline is out of the preset range is increased, the controller may sequentially restrict selection for menu items in order of a menu item having a larger depth.

In an embodiment of the present invention, if the driver's eyeline is out of the preset range for more than the predetermined time, the controller may output, to the touch screen, notification information for counting-down remaining time before an input function with respect to the touch screen is restricted. The input function with respect to the touch screen may be restricted as the remaining time lapses.

ADVANTAGEOUS EFFECTS

Firstly, a driver's eyeline may be detected while a vehicle is running, and screen information output to a touch screen may be converted or a touch input to the touch screen may be restricted, if the driver's eyeline is out of a preset range for more than a predetermined time as the driver applies a touch input to the touch screen. With such a configuration, the driver's eyeline may be induced to be toward the front side, while at least part of the screen information output to the electronic device is maintained.

Secondly, if the driver's eyeline is out of a preset range for more than a predetermined time (i.e., if the driver stares at the touch screen for more than a predetermined time), the touch screen may be turned off, or an image received through a camera formed to be toward the front side may be output to the touch screen. This may induce the driver to stare at the front side, resulting in lowering an accident rate.

Figure 13:
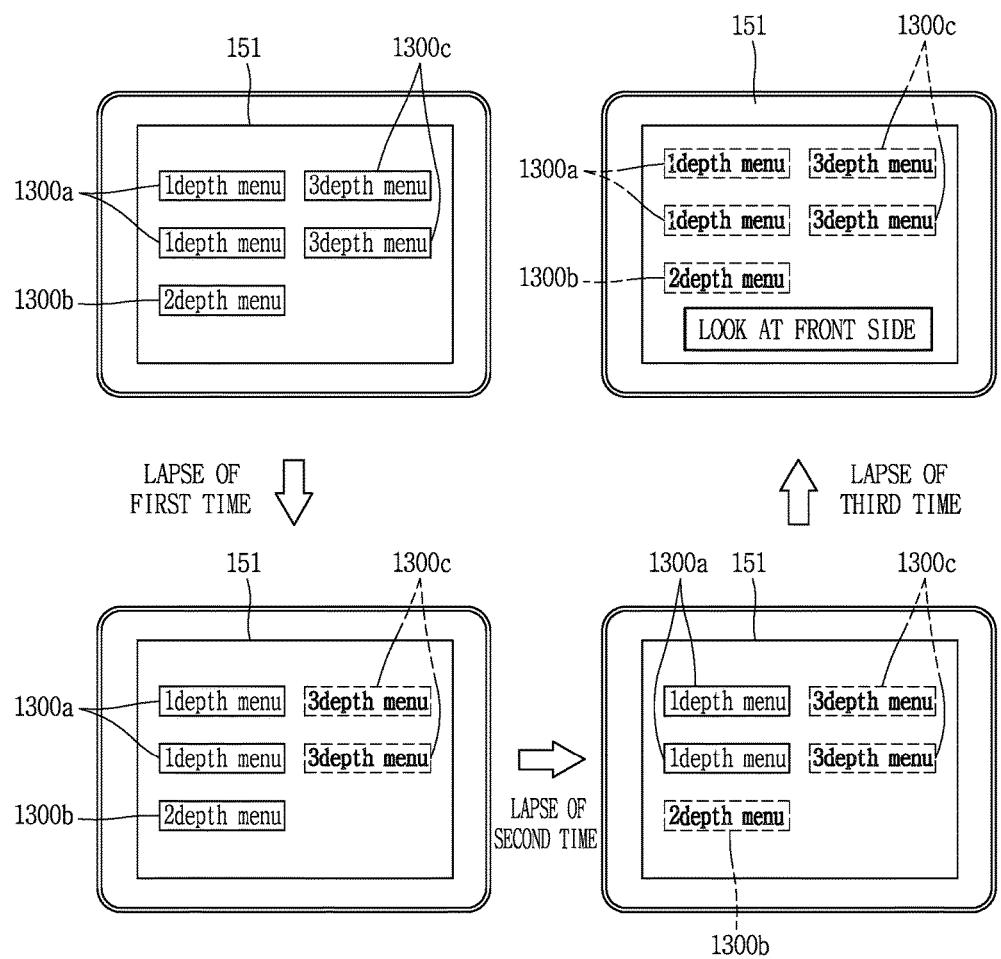
Figure 14:
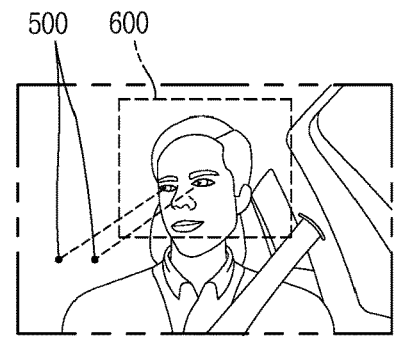
Figure 14:
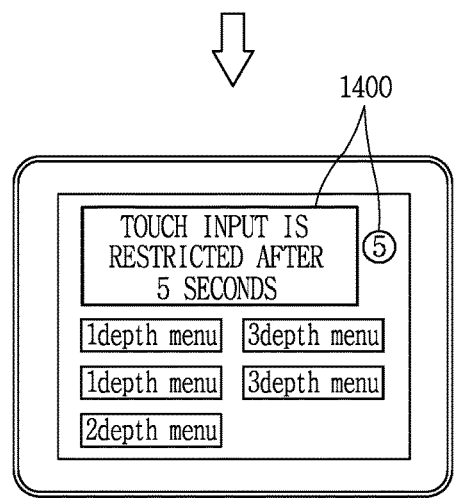
Figure 14:
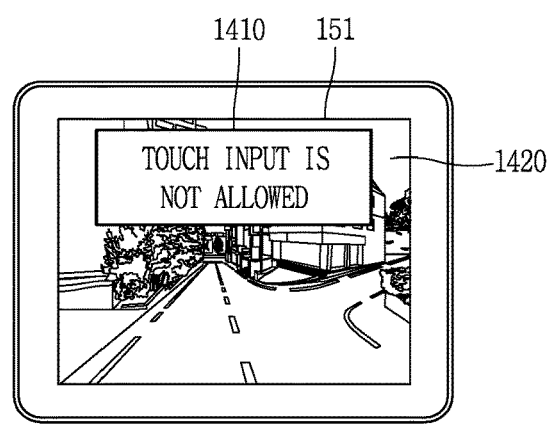

FIG. 13 is a conceptual view illustrating a method of restricting selection of menu items having different depths, in an electronic device according to an embodiment of the present invention; and FIG. 14 is a conceptual view illustrating that an input to a touch screen is restricted according to another embodiment of the present invention.

MODES FOR CARRYING OUT THE PREFERRED EMBODIMENTS

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

The exemplary embodiments of the present invention will now be described with reference to the accompanying drawings, in which similar numbers refer to similar elements throughout.

Also, in describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings.

Electronic devices presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, telematics terminals, and the like.

By way of non-limiting example only, further description will be made with reference to particular types of mobile terminals. However, such teachings apply equally to other types of terminals, such as those types noted above. In addition, these teachings may also be applied to portable electronic devices not using a communication network such as PMPs, and stationary terminals such as navigations, telematics terminals, refrigerators and projectors.

Figure 1:
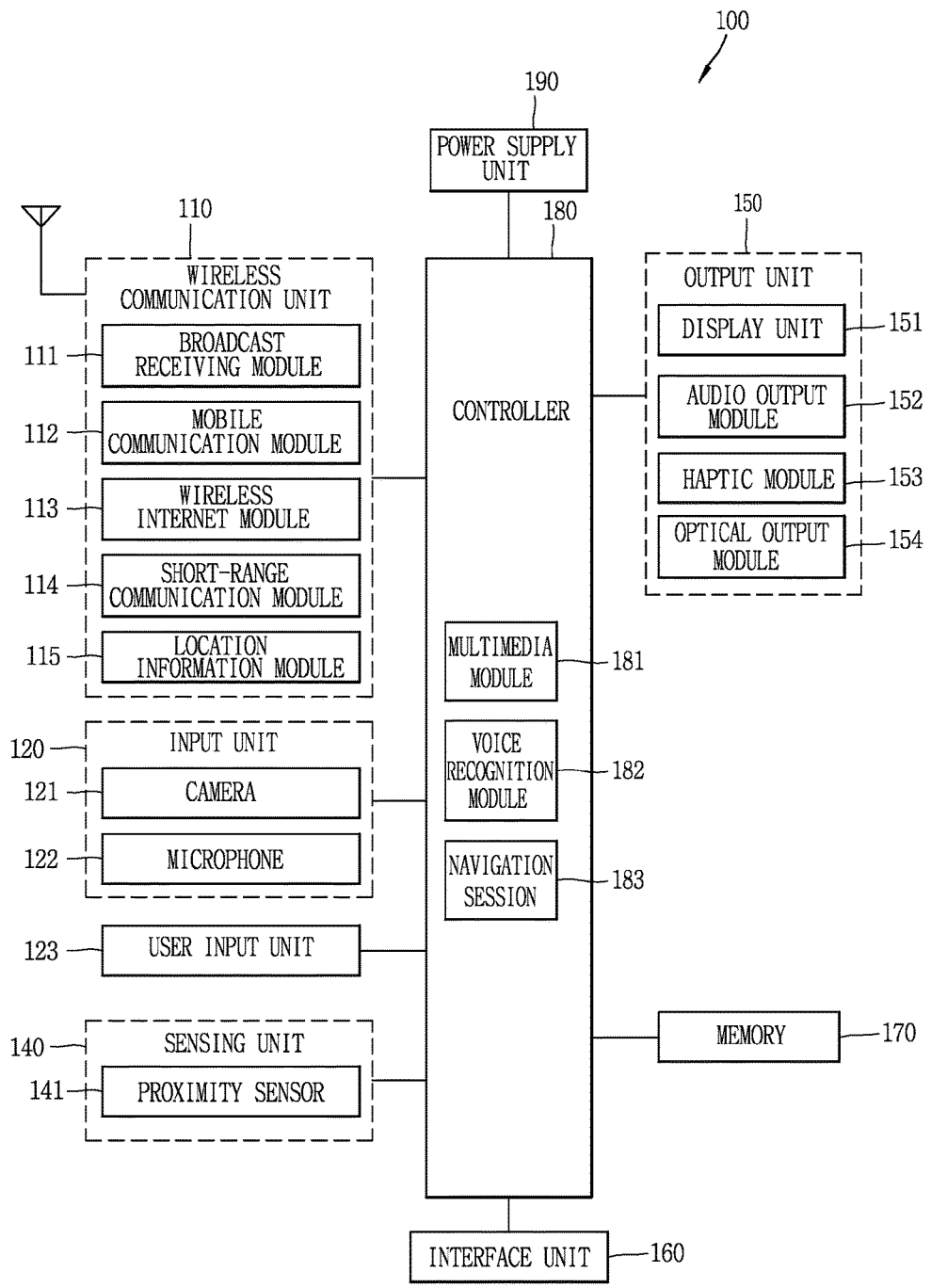
FIG. 1 is a block diagram illustrating a configuration of an electronic device according to an embodiment of the present invention.

As illustrated in FIG. 1, the electronic device 100 includes a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the electronic device 100 having various components, but it is understood that implementing all of the illustrated components is not a requirement. The electronic device 100 may be implemented by greater or fewer components.

The wireless communication unit 110 typically includes one or more components allowing radio communication between the electronic device 100 and a wireless communication system or a network in which the mobile communication terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only) (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the terminal. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, Wireless LAN (Bluetooth, 802.11n) and the like.

The location information module 115 is a module for checking or acquiring a location (or position) of the mobile communication terminal (when the mobile communication terminal is located in a vehicle, the location of the vehicle can be checked). For example, the location information module 115 may be embodied by using a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile communication terminal according to trigonometry on the basis of the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi position system and/or a hybrid positioning system may be used.

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capturing device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile communication terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the electronic device 100 such as an opened or closed state of the electronic device 100, a location of the electronic device 100, the presence or absence of user contact with the electronic device 100 (i.e., touch inputs), the orientation of the electronic device 100, an acceleration or deceleration movement and direction of the electronic device 100, etc., and generates commands or signals for controlling the operation of the electronic device 100. For example, when the electronic device 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The sensing unit 140 may include a proximity sensor 141, a pressure sensor 143, a motion sensor 145, etc. The proximity sensor 141 may sense presence or absence of an object approaching a surface, or an object located near a surface of the electronic device 100, by using an electromagnetic field, infrared rays, or the like without a mechanical contact. The proximity sensor 141 may be provided in more than two.

The pressure sensor 143 may sense whether pressure is being applied to the electronic device 100 or not, a pressure size, etc. The pressure sensor 143 may be installed at a region of the electronic device 100 requiring pressure sensing, according to a usage environment. If the pressure sensor 143 is installed at the display unit 151, a touch input to the display unit 151 may be distinguished from a pressure touch input applied with a larger pressure than the touch input, based on a signal output from the pressure sensor 143. Further, a size of a pressure touch applied to the display unit 151 may be calculated based on a signal output from the pressure sensor 143.

The motion sensor 145 senses a position, a motion, etc. of the electronic device 100 using an acceleration sensor, a gyro sensor, etc. An acceleration sensor applied to the motion sensor 145 is a device for converting an acceleration change in one direction into an electrical signal, and is being widely used as micro-electromechanical systems (MEMS) techniques develop. The acceleration sensor includes various sensors. For instance, the acceleration sensor includes a sensor mounted to an airbag system of a vehicle and configured to measure a large acceleration used to sense collision, a sensor configured to measure a micro acceleration used to apply an input in a game, etc., by recognizing a sophisticated operation of a person's hand. The acceleration sensor is formed as two or three axes are mounted to a single package. However, in some cases, the acceleration sensor may be formed as a single axis is mounted to a single package. In a case where an X-axis acceleration sensor or a Y-axis acceleration sensor is used instead of a Z-axis acceleration sensor, the acceleration sensor is mounted to a main board in an upright state, using an additional piece substrate.

The gyro sensor configured to measure an angular speed may sense a rotation direction based on a reference direction.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the electronic device 100. For example, when the electronic device 100 is in a phone call mode, the display unit 151 may display a User Interface (UI) or a Graphic User Interface (GUI) associated with a call or other communication (such as text messaging, multimedia file downloading, etc.). When the electronic device 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. The electronic device 100 may include two or more display units (or other display means) according to its particular desired embodiment. For example, the mobile terminal may include both an external display unit (not shown) and an internal display unit (not shown).

When the display unit 151 and the touch pad are overlaid in a layered manner to form a touch screen, the display unit 151 may function as both an input device and an output device. The touch sensor may have the form of, for example, a touch film, a touch sheet, a touch pad, and the like.

The touch sensor may be configured to convert the pressure applied to a particular portion of the display unit 151 or a change in capacitance generated at a particular portion of the display unit 151 into an electrical input signal. The touch sensor may be configured to detect a touch input pressure as well as a touch input position and a touch input area. When there is a touch input with respect to the touch sensor, the corresponding signal(s) are sent to a touch controller (not shown). The touch controller processes the signal(s) and transmits corresponding data to the controller 180. Accordingly, the controller 180 can recognize a touched region of the display unit 151.

A proximity sensor 141 may be may be disposed within the mobile terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

The example of the proximity sensor 141 may be a transmission type photo sensor, a direct reflection type photo sensor, a mirror-reflection type photo sensor, an RF oscillation type proximity sensor, a capacitance type proximity sensor, a magnetic proximity sensor, an infrared proximity sensor. When the touch screen is an electrostatic type touch screen, an approach of the pointer is detected on the basis of a change in an electric field according to the approach of the pointer. In this case, the touch screen (touch sensor) may be classified as a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the electronic device 100. The audio output module 152 may include a receiver, a speaker, a buzzer, etc.

The alarm unit 153 outputs a signal for informing about an occurrence of an event of the electronic device 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. When a call signal is received or a message is received, the alarm unit 153 may vibrate the mobile terminal through a vibration means. Or, when a key signal is inputted, the alarm unit 153 may vibrate the electronic device 100 through a vibration means as a feedback with respect to the key signal input. Through the vibration, the user may recognize the occurrence of an event. A signal for notifying about the occurrence of an event may be output to the display unit 151 or to the voice output module 152.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the electronic device 100. The haptic module 154 may be provided to a place which is frequently in contact with the user. For example, the haptic module 154 may be provided to a steering wheel, a gearshift, a lever, a seat, and the like.

The memory 160 may store software programs used for the processing and controlling operations performed by the controller 180, or may temporarily store data (e.g., a map data, phonebook, messages, still images, video, etc.) that are inputted or outputted.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the electronic device 100 may be operated in relation to a web storage device that performs the storage function of the memory 160 over the Internet.

The interface unit 170 serves as an interface with every external device connected with the electronic device 100. For example, the external devices may transmit data to an external device, receives and transmits power to each element of the electronic device 100, or transmits internal data of the electronic device 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like. Here, the identification module may be a chip that stores various types of information for authenticating the authority of using the electronic device 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port. The interface unit 170 may be used to receive inputs (e.g., data, information, power, etc.) from an external device and transfer the received inputs to one or more elements within the electronic device 100 or may be used to transfer data between the mobile terminal and an external device.

When the electronic device 100 is connected with an external cradle, the interface unit 170 may serve as a passage to allow power from the cradle to be supplied therethrough to the electronic device 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof. For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself. For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

The voice recognition module 182 (voice recognition engine) recognizes a voice pronounced by the user and performs a corresponding function according to the recognized voice signal.

A navigation session 300 applied to the electronic device 100 displays a route from a point of departure to a destination on map data.

The electronic device 100 according to the present invention includes a touch screen 151, a camera 121 configured to capture a driver, and a controller 180 configured to detect a driver's eyeline based on an image received through the camera 121, and configured to control a preset function to be executed on the touch screen 151, if the driver's eyeline is out of a preset range for more than a predetermined time. The electronic device 100 may further include the camera 121 formed to be toward the front side of a vehicle. The controller 180 may output an image received through the camera 121 to the touch screen 151, if the driver's eyeline is out of the preset range for more than the predetermined time. The electronic device 100 may further include a display unit 151*a* formed at a different position from the touch screen 151. The controller 180 may output screen information output to the touch screen 151, to the display unit 151*a*, if the driver's eyeline is out of the preset range for more than the predetermined time. Screen information displayed on the touch screen 151 may be pre-stored in the memory 160, or may be received from an external network through the communication unit 110.

The communication unit includes at least one of the aforementioned wireless communication module 110 and the interface unit 170, and executes communication with another terminal in a wireless or wired manner. Hereinafter, a reference numeral of the communication unit will be omitted.

If the controller 180 is implemented by software, procedures or functions of the controller 180 may be implemented together with an additional software module for executing at least one function or operation. The software code may be implemented by a software application written in a proper program language. The software code may be also executed by the controller 180.

In a preferred embodiment of the present invention, the electronic device 100 may be mounted to a vehicle and may be implemented as a component of a vehicle terminal 700. The vehicle terminal 700 serves to control a vehicle where the vehicle terminal 700 is mounted, or serves to transmit information on the vehicle. For instance, the vehicle terminal 700 may provide information on a vehicle, such as a vehicle speed and a gear state, or turn on/off an emergency light of the vehicle. As another example, the vehicle terminal 700 may turn on/off a headlight, may determine whether a passenger has sat through a sensor installed at a seat inside the vehicle, or may turn on/off a horn (klaxon). The vehicle terminal 700 may include a Head-Up Display (HUD) 751 or a projector 751. The vehicle terminal 700 may include an input button 730 for executing a user input. The input button 730 may be provided near a handle, a dashboard and a gearshift of the vehicle, or at an armrest of the vehicle. The input button 730 may serve as the user input unit 130 of the electronic device 100.

More specifically, the controller 180 of the electronic device 100 may provide screen information to the touch screen 151, and may provide the screen information to the HUD 751 or the projector 751 through communication with the vehicle terminal 700. The screen information may include all types of screen information outputtable from the electronic device, such as map information, path information, music and videos.

The controller 180 may control the screen information to be displayed on a dashboard of the vehicle through the vehicle terminal 700, or to be displayed on a front glass of the vehicle using the HUD (Head-Up Display) 751 or the projector 751 of the vehicle terminal 700. The HUD may be mounted to a dashboard of the vehicle. Since the HUD and the projector may be implemented as a general HUD and a general projector, detailed explanations thereof will be omitted.

The electronic device 100 may be mounted to a vehicle, and may be a component of the vehicle terminal 700. More specifically, the vehicle terminal 700 may include the electronic device 100 as a component.

However, the vehicle terminal 700 may be understood as an embodiment of the electronic device 100. That is, when the electronic device 100 is provided in a vehicle, the vehicle terminal 700 may mean the electronic device 100. In this case, the electronic device 100 provided at the vehicle may include all configurations and functions of the vehicle terminal 700.

Hereinafter, a telematics terminal 200, an embodiment of the electronic device 100 according to the present invention will be explained in more detail with reference to the attached drawings.

Figure 2:
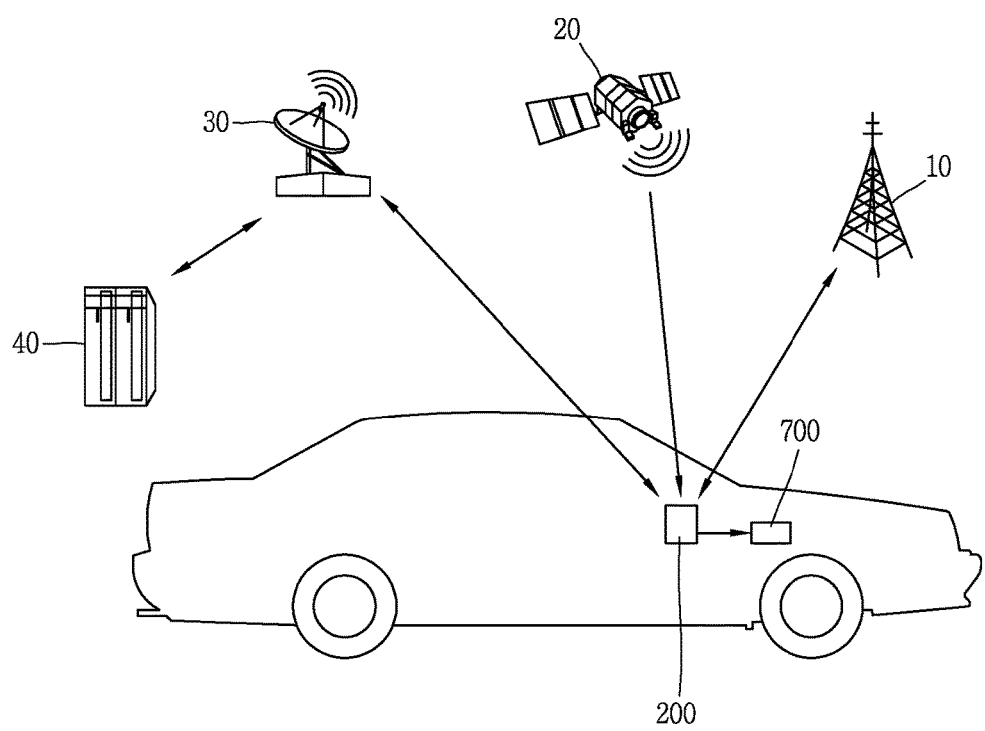
FIG. 2 is a block diagram illustrating a system of a telematics terminal according to an embodiment of the present invention.

FIG. 2 is a block diagram illustrating a telematics terminal system of a vehicle according to exemplary embodiments of the present disclosure.

As illustrated in FIG. 2, a telematics terminal system of a vehicle includes an information providing center (server) 40 providing traffic information and various types of data (e.g. a program, an execution file, and the like); and a telematics terminal 200 mounted within a vehicle, receiving traffic information through a wide area wireless communication network 30 and/or a local area wireless communication network, and providing a road guidance service on the basis of an artificial satellite 20. Here, the communication network may further include a wired/wireless communication network such as a local area network (LAN) or a wide area network (WAN).

Through the communication network, various types of traffic information (e.g., road traffic information, information regarding a point of interest (POI)) including information regarding a traffic light, are collected, and the collected information is processed by the information providing center 40 (e.g., a server) according to a TPEG (Transport Protocol Expert Group) standard and transmitted to a broadcast station. Then, the broadcast station inserts the traffic information including the information regarding a traffic light into a broadcast signal and broadcasts the same to the telematics terminal 200 of the vehicle. The information providing center 30 (for example, a server) may transmit the traffic information to the telematics terminal 200 of the vehicle through the communication network.

The server reconfigures various types of traffic information, which are collected through various paths connected to the communication network, for example, according to an operator input, through the wired/wireless Internet, from digital broadcast services such as a TDC (Transparent Data Channel) or a MOC (Multimedia Object Transport), from a different server, or from a probe car, into a traffic information format such as a format in conformity with a TPEG (Transport Protocol Expert Group) standard, namely, for example, a standard for a traffic information service, and transmits the same to the broadcast station or the telematics terminal 200.

The server may generate a traffic information format on the basis of the TPEG standard including traffic light information, and transmit the same to the broadcast station. The traffic information may include traffic light information and may also include information regarding various traffic conditions required for vehicle driving in roads, sea traffic, airline flights, such as accidents, a road situation, traffic congestion, road construction, road blockage (or road closure), a public transportation network delay, air transportation holdup, and the like.

The broadcast station receives the processed traffic information including traffic light information from the server and transmits it through digital signals in conformity with various digital broadcast standards to the vehicle 200. In this case, the broadcast standards include a European digital audio broadcasting (DAB) standard on the basis of Eureca-147 [ETSI EN 300 401), a terrestrial or satellite digital multimedia broadcasting (DMB) standard, a terrestrial digital video broadcasting (DVB-T) standard, a mobile digital video broadcasting-handheld (DVB-H) standard, media forward link only (MFLO) standard, and the like.

Also, the broadcast station may transmit the traffic information including the traffic light information through a wired/wireless network such as the wired/wireless Internet.

The vehicle where the telematics terminal 200 has been mounted means all types of carriages implemented using machines and electronic devices for the purpose of carrying persons or objects, and includes a car, a bus, a train, a ship, an airplane, etc.

The telematics terminal 200 receives traffic light information included in the traffic information and transfers the traffic light information to the user through graphics, text, and/or audio.

The telematics terminal 200 may include a mobile communication module. The mobile communication module transmits and/or receives radio signals to and/or from at least one of a base station 10, an external terminal and a server. Such radio signals may include a voice call signal, a video call signal or various types of data according to text and/or multimedia message transmission and/or reception.

The telematics terminal 200 executes communication with the vehicle terminal 700 in a wired or wireless manner. The vehicle terminal 700 serves to control a vehicle, or serves to transmit information on the vehicle. For instance, the vehicle terminal 700 may provide information on a vehicle, such as a vehicle speed and a gear state, or turn on/off an emergency light of the vehicle. As another example, the vehicle terminal 700 may turn on/off a headlight, may determine whether a passenger has sat through a sensor installed at a seat inside the vehicle, or may turn on/off a horn (klaxon). The vehicle terminal 700 may include a Head-Up Display (HUD) or a projector.

Hereinafter, a configuration of the telematics terminal 200 according to an exemplary embodiment of the present disclosure will be described with reference to FIG. 3.

Figure 3:
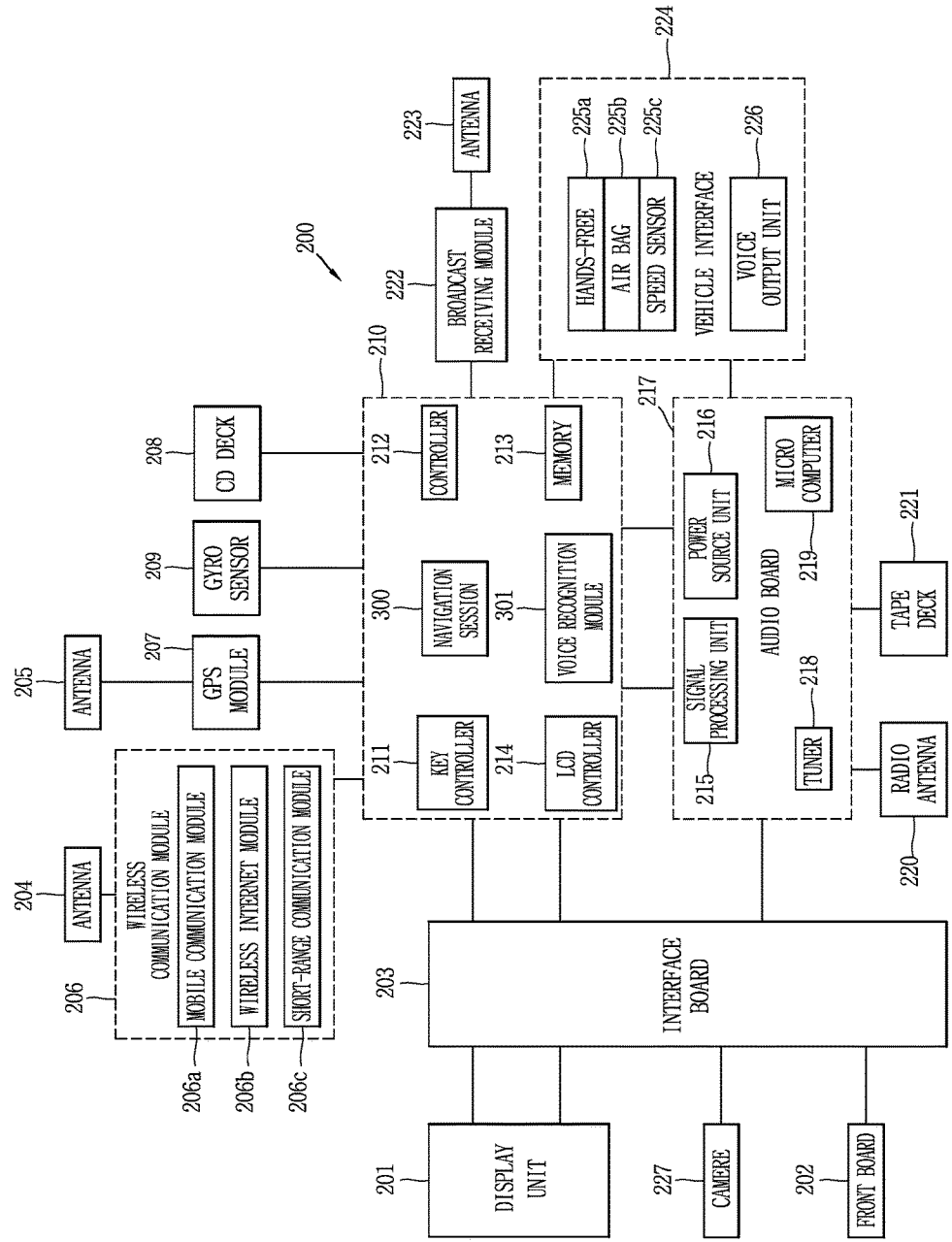
FIG. 3 is a block diagram illustrating a configuration of a telematics terminal according to an embodiment of the present invention.

FIG. 3 is a schematic block diagram illustrating a configuration of the telematics terminal 200 according to exemplary embodiments of the present disclosure.

As illustrated in FIG. 3, the telematics terminal 200 includes a main board 210 including a controller 212 (e.g., a central processing unit (CPU)) for controlling the telematics terminal 200 on the whole, a memory 213 for storing various types of information, a key controller 211 for controlling various key signals, and a liquid crystal display (LCD) controller 214 for controlling an LCD.

The memory 213 stores map information (map data) for displaying road guidance information on a digital map. Also, the memory 213 stores a traffic information collecting control algorithm for inputting traffic information according to the situation of a road in which the vehicle currently travels (runs), and information for controlling the algorithm.

The telematics terminal 200 includes a wireless communication module 206 including a short-range communication unit (for example, Bluetooth™) and a remote communication unit (for example, a code division multiple access (CDMA) communication unit), a global position system (GPS) module 207 for guiding a location of the vehicle, receiving a GPS signal for tracking a travel route from a start point to a destination, or transmitting traffic information collected by the user, as a GPS signal, a CD deck 208 for reproducing a signal recorded in a CD (Compact Disk), a gyro sensor 209, and the like.

The wireless communication module 206 and the GPS module 207 may transmit and receive signals through antennas 204 and 205.

The wireless communication module 206 may include a mobile communication module 206a implemented as a mobile electronic device having a unique device number, and configured to transmit and receive wireless signals to/from at least one of a base station, an external terminal and a server on a mobile communication network; a wireless Internet module 206b configured to support wireless Internet access using a wireless local area network (WLAN), Wi-Fi, wireless broadband (WiBro), world interoperability for microwave access (WiMAX), high speed downlink packet access (HSDPA), and the like; and a short-range communication module 206c configured to support short range communications using Bluetooth™, Radio Frequency IDentification (RFID), Infrared Data Association (IrDA), Ultra-WideBand (UWB), ZigBee, Wireless LAN (Bluetooth, 802.11n) and the like.

A broadcast receiving module 222 is connected with the main board 210 and receives a broadcast signal via an antenna 223. A display unit (i.e., an LCD) 201 under the control of the LCD controller 214, a front board 202 under the control of the key controller 211, and a camera 227 for capturing the interior and/or the exterior of a vehicle are connected to the main board 210 via an interface board 203. The display unit 201 displays various video signals and character signals, and the front board 202 includes buttons for various key signal inputs and provides a key signal corresponding to a button selected by the user to the main board 210. Also, the display unit 201 includes a proximity sensor and a touch sensor (touch screen) of FIG. 2.

The front board 202 includes a menu key for directly inputting traffic information. The menu key may be configured to be controlled by the key controller 211.

An audio board 217 is connected with the main board 210 and processes various audio signals. The audio board 217 includes a microcomputer 219 for controlling the audio board 217, a tuner 218 for receiving a radio signal, a power source unit 216 for supplying power to the microcomputer 219, and a signal processing unit 215 for processing various voice signals.

The audio board 217 also includes a radio antenna 220 for receiving a radio signal and a tape deck 221 for reproducing an audio tape. The audio board 217 may further include a voice output unit (e.g., an amplifier) 226 for outputting a voice signal processed by the audio board 217.

The voice output unit (amplifier) 226 is connected to a vehicle interface 224. Namely, the audio board 217 and the main board 210 are connected to the vehicle interface 224. A handsfree 225a for inputting a voice signal, an airbag 225b configured for the security of a passenger, a speed sensor 225c for detecting a speed of the vehicle, and the like, may be connected to the vehicle interface 224. The speed sensor 225c calculates a vehicle speed and provides the calculated vehicle speed information to the CPU 212.

The navigation session 300 applied to the telematics terminal 200 generates road guidance information on the basis of the map data and current location information of the vehicle and provides the generated road guidance information to a user.

The display unit 201 detects a proximity touch within a display window via a proximity sensor. For example, when a pointer (e.g., user's finger or a stylus) is proximity-touched, the display unit 201 detects the position of the proximity touch and outputs position information corresponding to the detected position to the controller 212.

A voice recognition module (or a voice recognition engine) 301 recognizes a voice pronounced by the user and performs a corresponding function according to the recognized voice signal.

The navigation session 300 applied to the telematics terminal 200 displays a travel route on map data.

The telematics terminal 200 to which the electronic device according to the present invention is applied includes a touch screen 201, a camera 227 configured to capture a driver, and a controller 212 configured to detect a driver's eyeline based on an image received through the camera, and configured to control a preset function to be executed on the touch screen 201, if the driver's eyeline is out of a preset range for more than a predetermined time.

The telematics terminal 200 may further include the camera 227 formed to be toward the front side of a vehicle. The controller 212 may output an image received through the camera 227, to the touch screen 201, if the driver's eyeline is out of the preset range for more than the predetermined time.

The telematics terminal 200 may further include a display unit 201a formed at a different position from the touch screen 201. The controller 212 may output screen information output to the touch screen 201, to the display unit 201a, if the driver's eyeline is out of the preset range for more than the predetermined time.

Screen information displayed on the touch screen 201 may be pre-stored in a memory 231, or may be received from an external network through a communication unit.

The communication unit includes at least one of the aforementioned wireless communication module 206 and the interface board 203, and executes communication with another terminal in a wireless or wired manner. Hereinafter, a reference numeral of the communication unit will be omitted.

If the controller 180 is implemented by software, procedures or functions of the controller 180 may be implemented together with an additional software module for executing at least one function or operation. The software code may be implemented by a software application written in a proper program language. The software code may be also executed by the controller 180.

In a preferred embodiment of the present invention, the telematics terminal 200 may be implemented as a component of the vehicle terminal 700 mounted to a vehicle. The vehicle terminal 700 serves to control a vehicle where the vehicle terminal 700 is mounted, or serves to transmit information on the vehicle. For instance, the vehicle terminal 700 may provide information on a vehicle, such as a vehicle speed and a gear state, or turn on/off an emergency light of the vehicle. As another example, the vehicle terminal 700 may turn on/off a headlight, may determine whether a passenger has sat through a sensor installed at a seat inside the vehicle, or may turn on/off a horn (klaxon). The vehicle terminal 700 may include a Head-Up Display (HUD) 751 or a projector 751. The vehicle terminal 700 may include an input button 730 for executing a user input. The input button 730 may be provided near a handle, a dashboard and a gearshift of the vehicle, or at an armrest of the vehicle. The input button 730 may serve as the front board 202 of the telematics terminal 200.

More specifically, the controller 212 of the telematics terminal 200 may provide screen information to the touch screen 201, and may provide the screen information to the HUD 751 or the projector 751 through communication with the vehicle terminal 700. The screen information may include all types of screen information outputtable from an electronic device, such as map information, path information, music and videos.

The controller 180 may control the screen information to be displayed on a dashboard of the vehicle through the vehicle terminal 700, or to be displayed on a front glass of the vehicle using the HUD 751 or the projector 751 of the vehicle terminal 700. The HUD may be mounted to a dashboard of the vehicle. Since the HUD and the projector may be implemented as a general HUD and a general projector, detailed explanations thereof will be omitted.

Hereinafter, an electronic device 100 which may include at least one of the components of the aforementioned telematics terminal 200 and vehicle terminal 700 will be explained.

Figure 4:
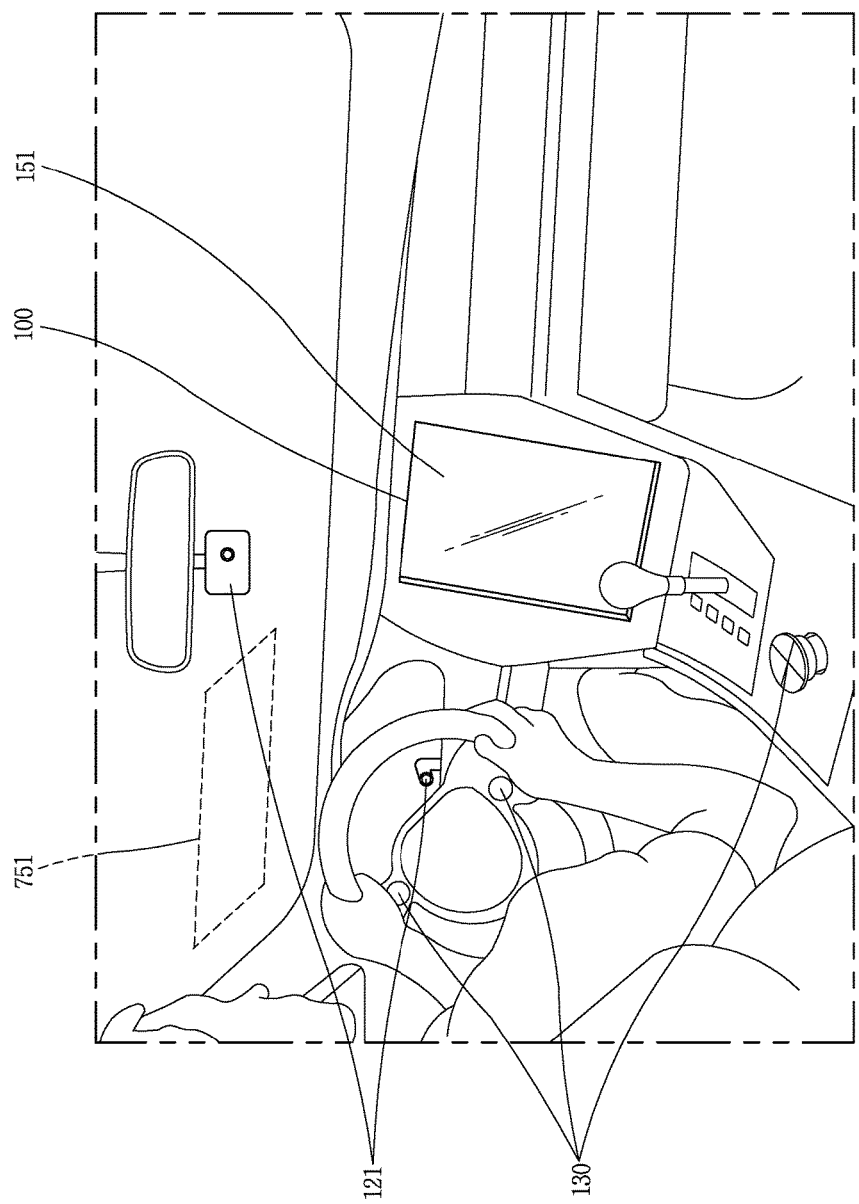
FIG. 4 is a block diagram illustrating a system inside a vehicle according to an embodiment of the present invention.

FIG. 4 is a block diagram illustrating a system inside a vehicle according to an embodiment of the present invention.

The vehicle of the present invention may be provided with an electronic device 100. The electronic device 100 may include at least one of the telematics terminal 200 and the vehicle terminal 700 shown in FIGS. 2 and 3. Hereinafter, a method of controlling a touch screen based on a driver's eyeline will be explained with reference to the configuration of the electronic device shown in FIG. 1. A configuration and technical features of the electronic device 100 may be applied to the telematics terminal 200 shown in FIGS. 2 and 3, in the same manner or in a similar manner.

Referring to FIG. 4, the vehicle may be provided with a touch screen 151. The touch screen 151 may be formed at a position where a driver's manipulation (selection, touch) can be executed. For instance, as shown in FIG. 4, the touch screen 151 may be formed near a handle of the vehicle. Various screen information which can be provided from the electronic device 100 may be output to the touch screen 151. For instance, map data (map information) and path information (driving information) may be output to the touch screen 151. Alternatively, an interface for outputting an image, a video, DMB, or music may be output to the touch screen 151.

If a touch input is applied to the touch screen 151, the controller 180 may execute a function related to a point where the touch input has been applied. For instance, in a state where a first menu has been output to the touch screen 151, if a touch input is applied to the first menu, the controller 180 may execute a function related to the first menu.

The vehicle may be provided with the user input unit 130. The user input unit 130 may be implemented as an input button, and the input button may be disposed at any component of the vehicle. For instance, the user input unit 130 may be provided near a handle, a dashboard and a gearshift of the vehicle, or at an armrest of the vehicle.

The vehicle may include a HUD 751. The HUD 751 may be formed on a front glass of the vehicle, and may display at least part of screen information output to the touch screen 151 of the electronic device 100.

If the user input unit 130 input button is provided at a handle of the vehicle, a user may press the user input unit 130 without detaching his or her hands from the handle while driving the vehicle. This may allow the user to drive the vehicle safely.

The controller 180 may control an operation of the touch screen 151 of the electronic device 100, based on an input signal input through the user input unit 130.

That is, the electronic device 100 may be controlled not only through a direct input to the touch screen 151, but also through an input to the user input unit 130.

Alternatively, the electronic device 100 may be controlled through a voice input to the microphone 122.

The vehicle may be provided with at least one camera 121 of the electronic device 100. The camera 121 may be formed to be toward a driver. That is, the camera 121 may be configured to capture a driver. Hereinafter, the camera 121 configured to capture a driver is called a driver-monitoring camera.

The camera 121 may be formed to be toward a front side of the vehicle. The controller 180 may store images received through the camera 121 formed to be toward the front side of the vehicle, as video. The camera 121 formed to be toward the front side of the vehicle may be a black box.

The electronic device 100 may output images received through the camera 121 formed to be toward the front side of the vehicle, to the touch screen 151.

Hereinafter, a method of controlling a touch screen based on a driver's eyeline according to an embodiment of the present invention will be explained in more detail with reference to the attached drawings.

Figure 5:
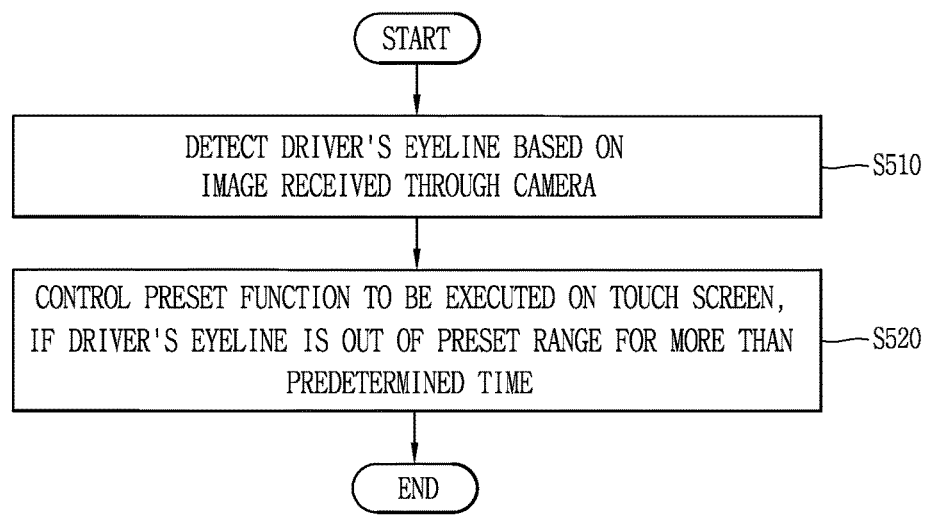
FIG. 5 is a flowchart illustrating a control method according to the present invention.
Figure 6:
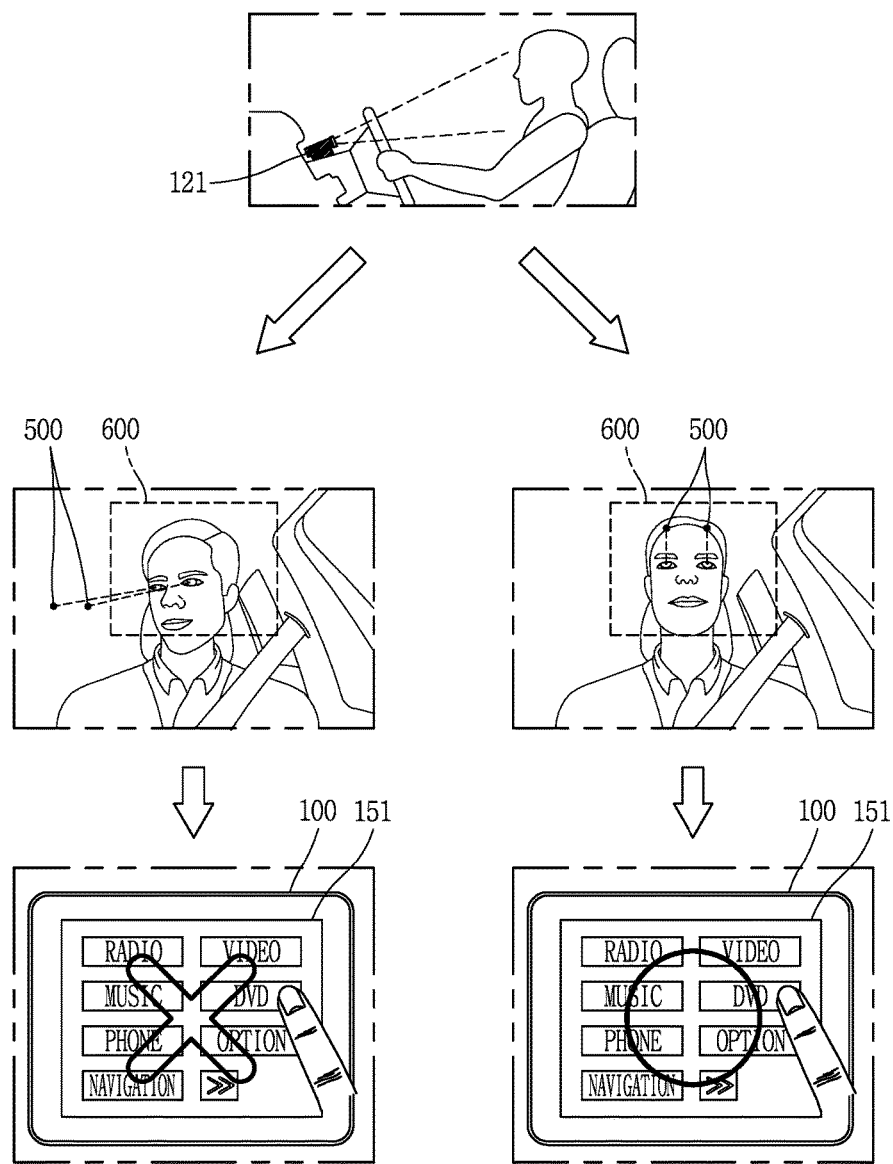
FIG. 6 is a conceptual view illustrating the control method shown in FIG. 5.

FIG. 5 is a flowchart illustrating a control method according to the present invention, and FIG. 6 is a conceptual view illustrating the control method shown in FIG. 5.

Firstly, a driver's eyeline is detected based on an image received through the camera 121 (S510). The camera 121 may be formed to be toward a driver. That is, the camera 121 may be formed to be toward a driver, and may be the aforementioned driver monitoring camera.

The controller 180 may detect (sense or determine) a driver's eyeline based on an image received through the camera 121. The driver's eyeline may mean a direction of the eyes of a driver, or a direction of a road at which the driver stares.

More specifically, the controller 180 may receive an image through the camera 121 formed to be toward a driver, and may detect a driver's eyeline 500 based on the received image. In this case, a general method of detecting a driver's eyeline based on a received image is used, and thus its detailed explanations will be omitted.

Then, the touch screen is controlled if the driver's eyeline is out of a preset range for more than a predetermined time, such that a preset function is executed on the touch screen (S520).

More specifically, the controller 180 may determine whether the detected driver's eyeline 500 is out of a preset range 600. The preset range 600 may mean a range (region) predetermined by a user or the controller in order to determine whether the driver's eyeline is toward the front side or not.

For instance, the preset range 600 may be set to part of an image received through the camera. The controller 180 may determine whether the driver's eyeline 500 detected based on an image received through the camera is within the preset range 600.

If the detected driver's eyeline 500 is out of the preset range 600, the controller 180 may execute a preset function. More specifically, the controller 180 may control a preset function to be executed on the touch screen 151, if the detected driver's eyeline 500 is out of the preset range 600 for more than a predetermined time.

The preset function may be related to a function to induce the driver's eyeline 500 to be toward the front side. That is, the preset function may be understood as a function to induce the driver's eyeline 500 to be within the preset range 600.

For instance, the preset function executed on the touch screen 151 may include various functions executable on the touch screen 151. For instance, the preset function may be restriction of an input to the touch screen. The restriction of an input to the touch screen may be understood as deactivation of a touch sensor included in the touch screen 151. That is, if an input to the touch screen is restricted, even if a touch input is applied to the touch screen, the controller 180 may not respond to this.

As another example, the preset function executed on the touch screen 151 may include turning off the touch screen, or outputting notification information inducing a user to look at the front side, or alarm information, to the touch screen.

As another example, the preset function executed on the touch screen 151 may include outputting an image received through the camera formed to be toward the front side of the vehicle, to the touch screen 151.

If the detected driver's eyeline 500 is out of the preset range 600 for more than a predetermined time, the controller 180 may change screen information output to the touch screen 151 such that selection for at least part of the screen information may be restricted.

In a case where a display unit 151*a* different from the touch screen 151 is formed at the vehicle, the controller 180 may output screen information output to the touch screen 151, to the display unit 151*a*, if the detected driver's eyeline 500 is out of the preset range 600 for more than a predetermined time.

In this case, the screen information may not be output to the touch screen 151.

The display unit 151*a* may be formed on a different position from the touch screen 151. That is, the electronic device 100 according to the present invention may further include the display unit 151*a* formed on a different position from the touch screen 151.

The display unit 151*a* may be disposed at a region of a passenger's seat or a rear seat where the display unit 151*a* is controllable. That is, if the detected driver's eyeline 500 is out of the preset range 600 for more than a predetermined time, the controller 180 may output screen information output to the touch screen, to the display unit 151*a*, such that a passenger rather than a driver may control the electronic device.

The controller 180 may check a position of a passenger rather than a driver using sensors disposed at seats, and may output the screen information to the display unit 151*a* disposed at a position where it is controllable by the passenger.

The display unit 151*a* may include a HUD 751. In this case, the electronic device 100 may output screen information output to the touch screen 151, to the HUD 751. And the electronic device 100 may execute a function corresponding to a voice command received through the microphone 122, or a control command input through the user input unit 130.

In the case where screen information output to the touch screen 151 is output to the HUD 751, information inducing input of a voice command or usage of the user input unit may be output to the HUD 751.

The preset function may be executed in a driving state of the vehicle. More specifically, if the driver's eyeline 500 is out of the preset range 600 for more than a predetermined time in a driving state of the vehicle, the controller 180 may execute the preset function. That is, the controller 180 may not execute the preset function in a stopped state of the vehicle, even if the driver's eyeline 500 is out of the preset range 600 for more than a predetermined time. No execution of the preset function may mean that the electronic device 100 (or the touch screen 151) is controllable to a state before the preset function is executed.

If a driving speed of the vehicle is less than a preset speed, the controller 180 may not execute the preset function in a driving state of the vehicle, even if the driver's eyeline 500 is out of the preset range 600 for more than a predetermined time.

The predetermined time may be measured based on a time point when the driver's eyeline 500 starts to be out of the preset range 600, or based on a time point when a touch input is applied to the touch screen.

More specifically, if the driver's eyeline 500 is out of the preset range 600, a time duration for which the driver's eyeline 500 is out of the preset range 600 may be measured based on a time point when the driver's eyeline 500 starts to be out of the preset range 600. If the measured time duration is more than a predetermined time, the controller 180 may execute the preset function.

If it is determined that a driver is manipulating the touch screen while driving the vehicle, the controller 180 may execute the preset function. More specifically, if it is determined that the driver's eyeline 500 is out of the preset range 600 and a touch input is applied to the touch screen 151, the controller 180 may determine that a driver is manipulating the touch screen 151. In this case, the controller 180 may execute the preset function, if the driver's eyeline 500 is out of the preset range 600 for more than a predetermined time based on a time point when the touch input has been applied to the touch screen 151.

The above descriptions may be understood more clearly with reference to FIG. 6.

Referring to the first drawing of FIG. 6, the electronic device 100 according to the present invention may include a camera 121 configured to capture a driver. An image received through the camera 121 may be shown in the second drawings of FIG. 6. The controller 180 may detect a driver's eyeline 500 based on the image.

The controller 180 may control a preset function to be executed on the touch screen 151, if the driver's eyeline 500 is out of the preset range 600 for more than a predetermined time.

For instance, as shown in the drawings connected to each other by the left arrows of FIG. 6, if the driver's eyeline 500 is out of the preset range 600 for more than a predetermined time, the controller 180 may restrict input to the touch screen 151.

On the other hand, as shown in the drawings connected to each other by the right arrows of FIG. 6, if the driver's eyeline 500 is included in the preset range 600, the controller 180 may maintain an input function with respect to the touch screen 151.

The electronic device according to the present invention may execute a different function according to a time duration for which a driver's eyeline is out of a preset range. Hereinafter, various functions executable in the electronic device according to time durations for which a driver's eyeline is out of a preset range will be explained in more detail with reference to the attached drawings.

Figure 7:
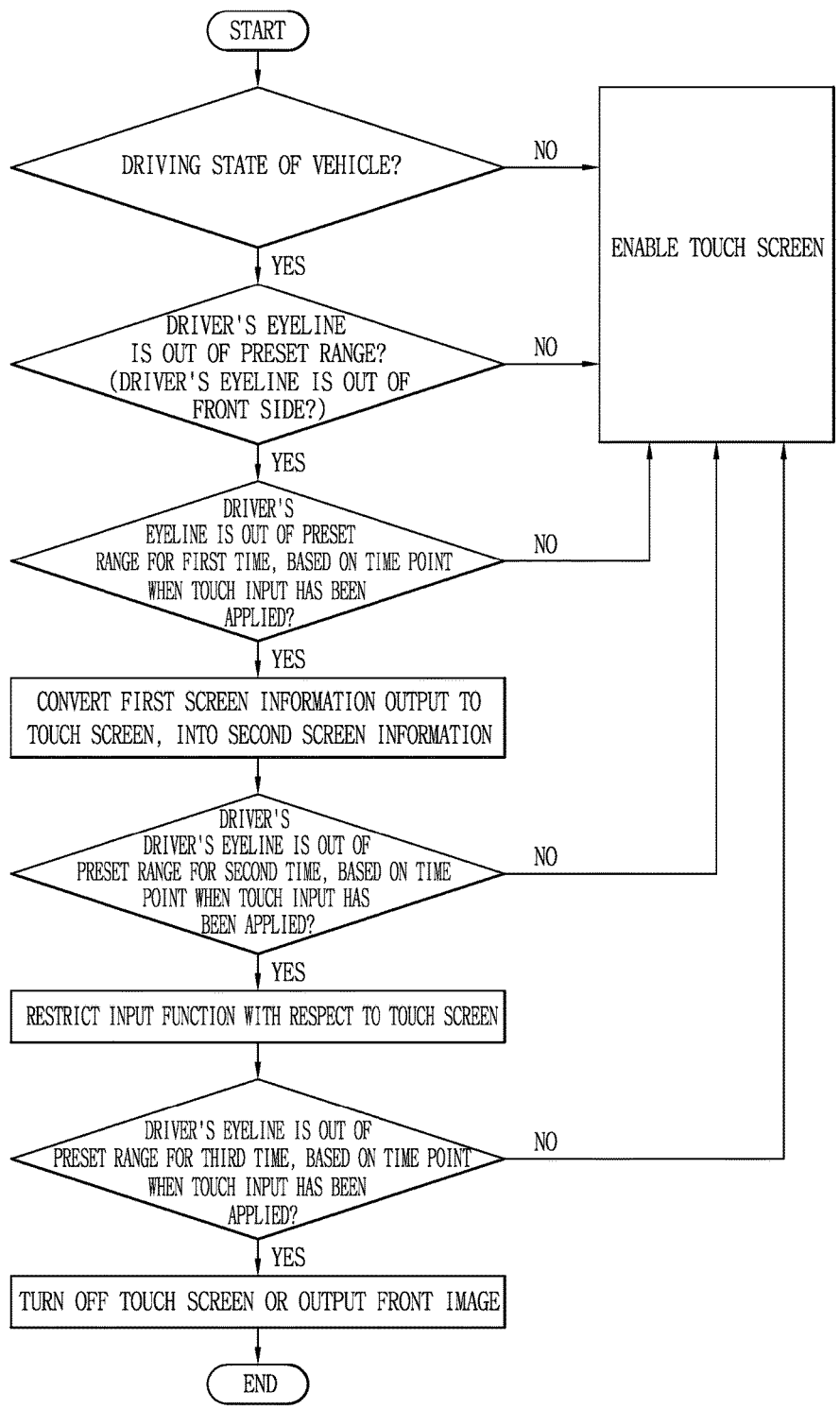
FIG. 7 is a flowchart illustrating a control method of an electronic device according to an embodiment of the present invention.

FIG. 7 is a flowchart illustrating a control method of an electronic device according to an embodiment of the present invention.

Firstly, the controller 180 of the electronic device 100 according to an embodiment of the present invention may determine whether the vehicle is running or not. If the vehicle is not running, the controller 180 may not execute a preset function on the touch screen 151. A state where a preset function is not executed on the touch screen 151 may be defined as an 'enable' state, which means that at least one function of the touch screen 151 (the electronic device 100) is normally operable.

For instance, if the vehicle is not running, the controller 180 may maintain an input function with respect to the touch screen 151.

On the other hand, if the vehicle is running, the controller 180 may activate the camera 121 formed to be towards a driver (to capture a driver). More specifically, the controller 180 may activate the camera 121 formed to be towards a driver, and may detect the driver's eyeline 500 based on an image received through the camera 121.

The controller 180 may determine whether the detected driver's eyeline 500 is out of the preset range 600. If the detected driver's eyeline 500 is included in the preset range 600, the controller 180 may maintain the touch screen in an enable state.

On the other hand, if the detected driver's eyeline 500 is out of the preset range 600 for a first time, the controller 180 may convert first screen information output to the touch screen 151, into second screen information different from the first screen information.

The first time is an example of the aforementioned predetermined time, and may be measured based on a time point when a touch input has been applied, in a state where the driver's eyeline 500 is out of the preset range 600.

That is, if the driver's eyeline 500 is out of the preset range 600 for a first time based on a time point when a touch input has been applied, the controller 180 may convert first screen information output to the touch screen 151, into second screen information different from the first screen information.

The second screen information may be formed as selection for at least part of information included in the first screen is restricted.

The second screen information will be explained in more detail with reference to FIG. 8.

Figure 8:
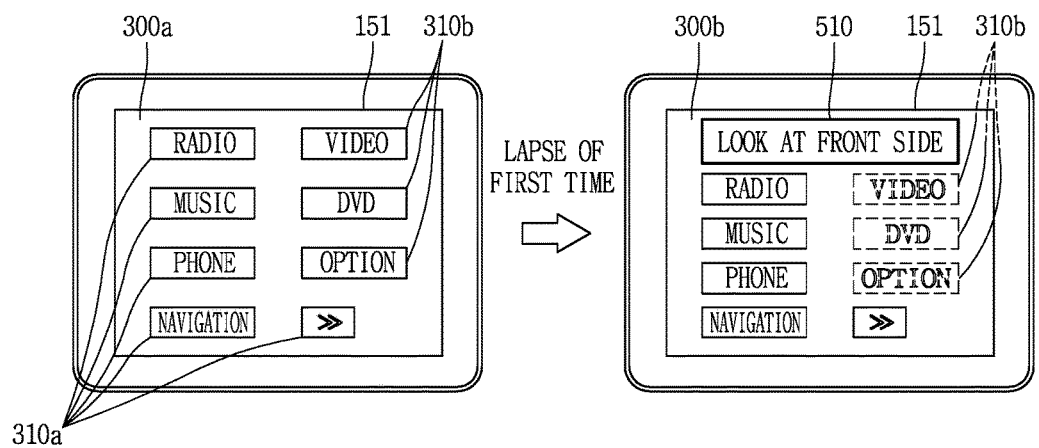
FIG. 8 is a conceptual view illustrating conversion of first screen information output to a touch screen of an electronic device according to an embodiment of the present invention, into second screen information.

FIG. 8 is a conceptual view illustrating conversion of first screen information output to the touch screen of the electronic device according to an embodiment of the present invention, into second screen information.

As shown in the first drawing of FIG. 8, first screen information 300a may be output to the touch screen 151 of the electronic device 100. The first screen information 300a may include menus for selecting functions executable in the electronic device 100. If one of the menus is selected (touched), the controller 180 of the electronic device 100 may execute a function corresponding to the selected menu.

As shown in the second drawing of FIG. 8, if the driver's eyeline 500 is out of the preset range 600 for more than a predetermined time, the controller 180 may output second screen information 300b formed as selection for at least part of information included in the first screen 300a is restricted.

More specifically, if the driver's eyeline 500 is out of the preset range 600 for a first time based on a time point when a touch input has been applied, the controller 180 may control at least part 310b among selectable information 310a, 310b output to the first screen information 300a, to be deactivated so as not to be selected.

The deactivated at least part 310b may be information (menu) for executing functions determined to have a manipulation time more than a reference time, among functions executable in the electronic device 100a. The functions may be determined by a user's selection, or under control of the controller 180.

If the driver's eyeline 500 is out of the preset range 600 for more than a predetermined time (or if the driver's eyeline 500 is out of the preset range 600 for more than a first time based on a time point when a touch input has been applied), the controller 180 may output warning information (or a warning message) 510 to the touch screen 151. As shown in the second drawing of FIG. 8, the notification information 510 may be included in the second screen information 300b.

Referring to FIG. 7 back, if the driver's eyeline 500 is out of the preset range 600 for a second time longer than the first time, the controller 180 may restrict an input function with respect to the touch screen 151. More specifically, if the driver's eyeline 500 is out of the preset range 600 for a second time longer than the first time (or if the driver's eyeline 500 is out of the preset range 600 for more than a second time longer than the first time based on a time point when a touch input has been applied), the controller 180 may restrict an input function with respect to the touch screen 151.

If the driver's eyeline 500 is out of the preset range 600 for the second time, the controller 180 may restrict an input function with respect to the touch screen 151, and may output notification information 520 indicating restriction of an input to the touch screen 151, to the touch screen 151.

If the input function with respect to the touch screen 151 is restricted, the controller 180 may output information inducing input of a voice command or usage of the user input unit, to the touch screen 151.

Figure 9:
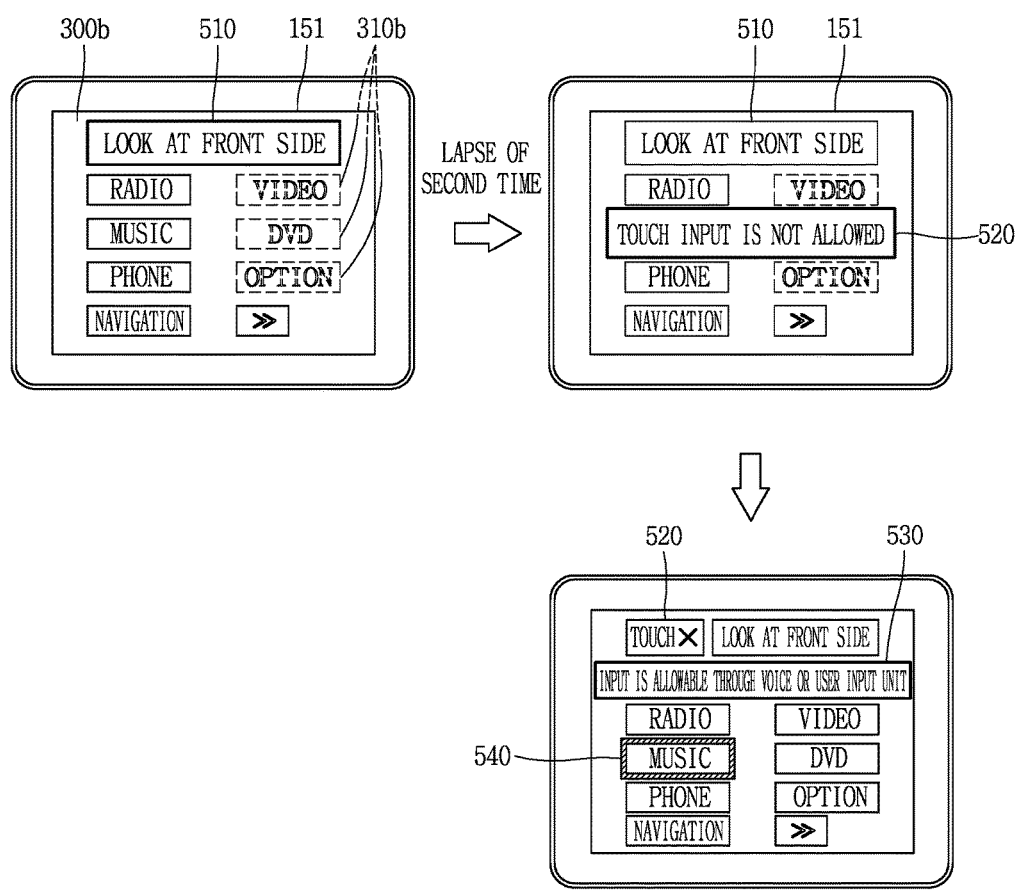
FIG. 9 is a conceptual view illustrating that an input to a touch screen is restricted in an electronic device according to an embodiment of the present invention.

In the case where the input function with respect to the touch screen 151 is restricted, screens may be output to the touch screen 151 as shown in FIG. 9.

FIG. 9 is a conceptual view illustrating that an input to the touch screen is restricted in the electronic device according to an embodiment of the present invention.

As shown in the first drawing of FIG. 9, second screen information 510 formed as selection for at least part of information included in first screen information is restricted may be output to the touch screen 151, if the driver's eyeline 500 is out of the preset range 600 for more than a first time, based on a time point when a touch input has been applied to the touch screen.

Then, as shown in the second drawing of FIG. 9, if the driver's eyeline 500 is out of the preset range 600 for more than a second time longer than the first time, the controller 180 may restrict a touch input to the touch screen 151. And the controller 180 may output, to the touch screen 151, notification information 520 indicating restriction of a touch input to the touch screen 151.

As shown in the third drawing of FIG. 9, if an input function with respect to the touch screen 151 is restricted, the controller 180 may output information 530 inducing input of a voice command or usage of the user input unit, to the touch screen 151.

That is, the controller 180 may output the information 530 inducing input of a voice command or usage of the user input unit. And the controller 180 may execute at least one function among functions executable in the electronic device, based on a voice command received from the microphone 122, or a control command received through the user input unit 130. Upon reception of the control command through the user input unit 130, an indicator 540 may be output to the touch screen 151.

A display position of the indicator 540 may become different according to a user's input applied to the user input unit 130.

Referring to FIG. 7 back, if the driver's eyeline 500 is out of the preset range 600 for a third time longer than the second time, the controller 180 may turn off the touch screen 151. More specifically, the controller 180 may turn off the touch screen 151, if the driver's eyeline 500 is out of the preset range 600 for more than a third time longer than the second time, based on a time point when a touch input has been applied to the touch screen.

If the driver's eyeline 500 is out of the preset range 600 for the third time longer than the second time, the controller 180 may output, to the touch screen 151, an image received through the camera 121 formed to be toward the front side of the vehicle, without turning off the touch screen 151.

Figure 10:
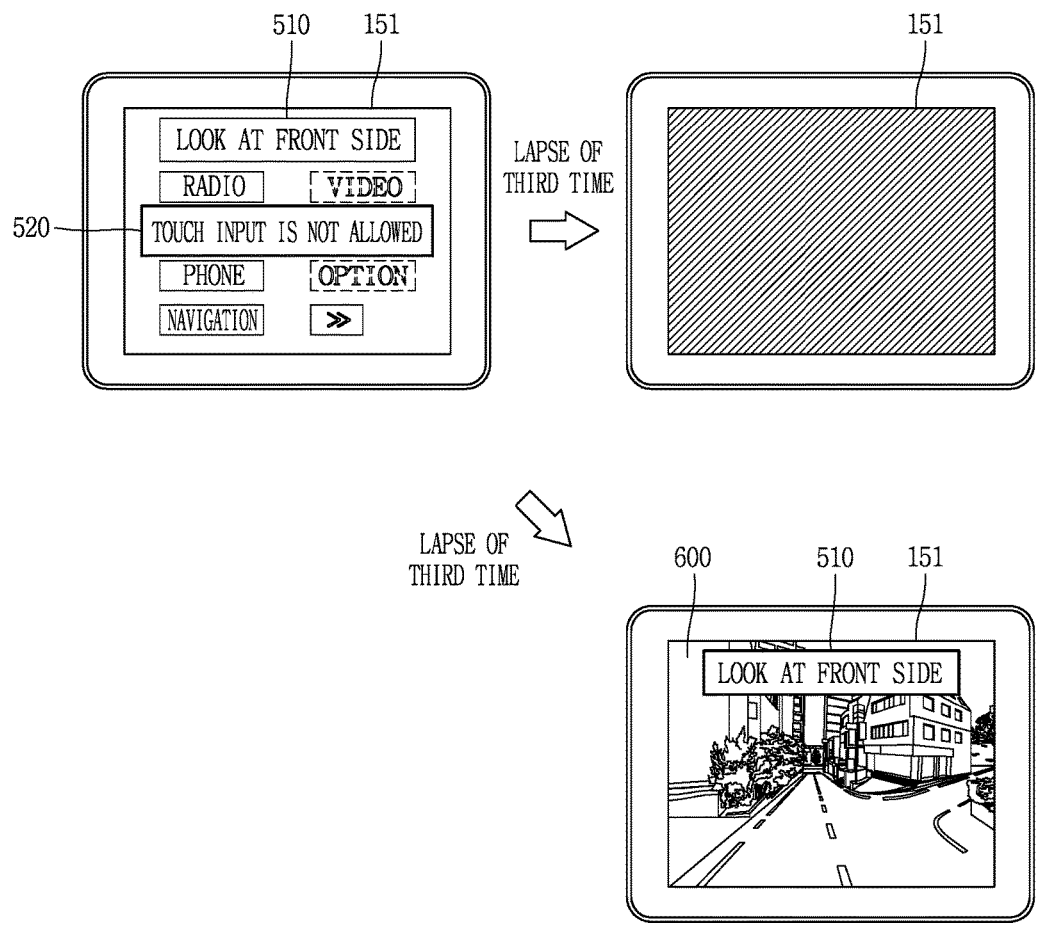
FIG. 10 is a conceptual view illustrating that a touch screen is turned off, or an image received through a camera formed to be toward a front side is output to the touch screen, in an electronic device according to an embodiment of the present invention.

FIG. 10 is a conceptual view illustrating that the touch screen is turned off, or an image received through the camera formed to be toward the front side is output to the touch screen, in the electronic device according to an embodiment of the present invention.

Referring to the first drawing of FIG. 10, if the driver's eyeline 500 is out of the preset range 600 for the third time longer than the second time, in a restricted state of an input to the touch screen 151, the controller 180 may turn off the touch screen 151 as shown in the second drawing of FIG. 10.

The electronic device according to the present invention may further include the camera 121 formed to be toward the front side of the vehicle. In this case, the controller 180 may output, to the touch screen 151, an image 600 received through the camera 121, without turning off the touch screen 151. With such a configuration, if it is determined that the driver's eyeline is continuously towards the touch screen, the image 600 related to the front side is output to the touch screen. This may allow the driver to check a front situation. Warning information (or a warning message) 510 inducing the driver to stare at the front side may be output to the image 600 related to the front side.

Although not shown, the electronic device according to the present invention may further include a display unit 151a formed at a different position from the touch screen 151. More specifically, if the display unit 151a different from the touch screen 151 is formed at the vehicle, the controller 180 may output screen information output to the touch screen 151, to the display unit 151a, if the detected driver's eyeline 500 is out of the preset range 600 for more than a predetermined time. In this case, the screen information may not be output to the touch screen 151.

The display unit 151a may be formed on a different position from the touch screen 151. That is, the electronic device 100 according to the present invention may further include the display unit 151a formed on a different position from the touch screen 151.

The display unit 151a may be disposed at a region of a passenger's seat or a rear seat where the display unit 151a is controllable. That is, if the detected driver's eyeline 500 is out of the preset range 600 for more than a predetermined time, the controller 180 may output screen information output to the touch screen, to the display unit 151a, such that a passenger rather than a driver may control the electronic device.

The controller 180 may check a position of a passenger rather than a driver using sensors disposed at seats, and may move the screen information to the display unit 151a disposed at a position where it is controllable by the passenger. If it is determined that there is no passenger except for the driver, the controller 180 may turn off the touch screen 151, or may output the image 600 related to the front side to the touch screen 151.

With such a configuration, if there is a passenger besides a driver, the passenger is induced to manipulate the electronic device, and the driver is induced to view the front side. This may make the driver stare at the front side more, and may reduce an accident rate.

Further, if a driver's eyeline is out of the front side (out of a preset range), a different function is executed according to a time duration for which the driver's eyeline is out of the front side (preset range). This may induce the driver to view the front side gradually or more positively.

In the present invention, if a driver's eyeline is out of a preset range for more than a predetermined time, at least one of functions executable as the aforementioned first to third times lapse may be executed. More specifically, if the driver's eyeline is out of the preset range for more than a predetermined time, the controller 180 may change screen information or restrict an input to the touch screen. Alternatively, the controller 180 may turn off the touch screen, output an image related to the front side, or may output screen information output to the touch screen to other display unit.

The electronic device according to the present invention may execute at least one of the functions aforementioned with reference to FIGS. 4 to 10, if the driver's eyeline is out of the preset range for more than the predetermined time, even if no touch input is applied to the touch screen.

For instance, if the driver's eyeline 500 is out of the preset range 600 in a driving state of the vehicle, the controller 180 may turn off the touch screen.

The controller 180 may determine whether the driver is staring the touch screen 151, based on an image received through the camera formed to capture the driver. More specifically, the controller 180 may determine whether the driver is staring at the touch screen 151 or not, based on the driver's eyeline sensed based on an image received through the camera.

That is, if it is determined that the driver's eyeline 500 is towards the touch screen 151 for more than a predetermined time in a driving state of the vehicle, the controller 180 may turn off the touch screen 151.

As another example, if it is determined that the driver's eyeline 500 is towards the touch screen 151 for more than a predetermined time in a driving state of the vehicle, the controller 180 may output an image received through the camera 121 formed to be toward the front side of the vehicle, to the touch screen 151. In this case, the controller 180 may output warning information (or a warning message) inducing the driver to stare at the front side.

The notification information may be output to the touch screen 151, or may be output through a speaker in the form of an alarm. Alternatively, the notification information may be output in the form of vibrations applied to a driver's seat or a handle.

Hereinafter, various embodiments of the electronic device according to the present invention will be explained in more detail with reference to the attached drawings.

The following descriptions may be executed under an assumption that the vehicle is in a driving state, or the vehicle is running at a speed more than a predetermined speed. Alternatively, the following descriptions may be also executed under an assumption that the vehicle is in a stopped state, or the vehicle is slowly running at a speed less than a predetermined speed.

Figure 11A:
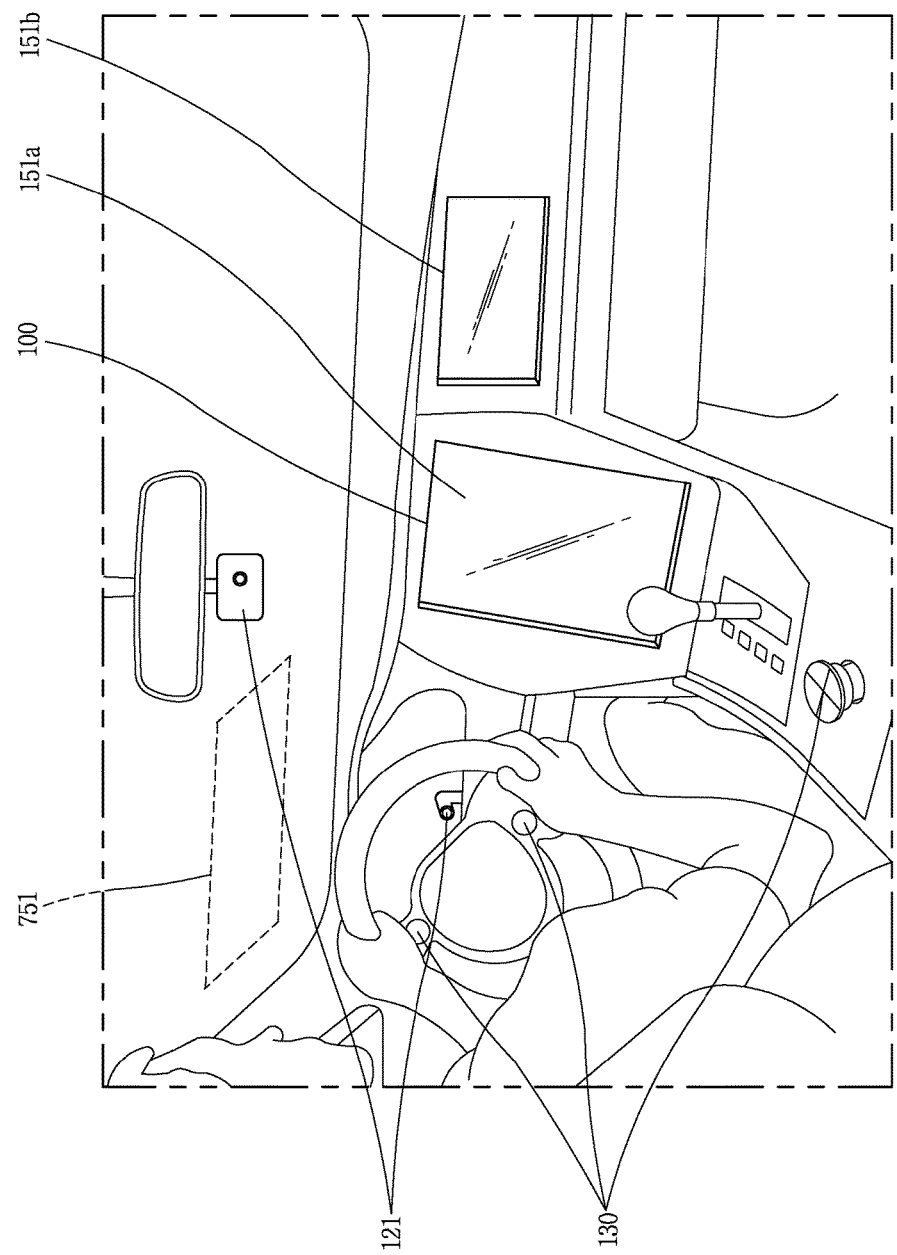
FIGS. 11A to 11C are conceptual views illustrating a control method when a plurality of touch screens are provided at an electronic device according to an embodiment of the present invention.
Figure 11B:
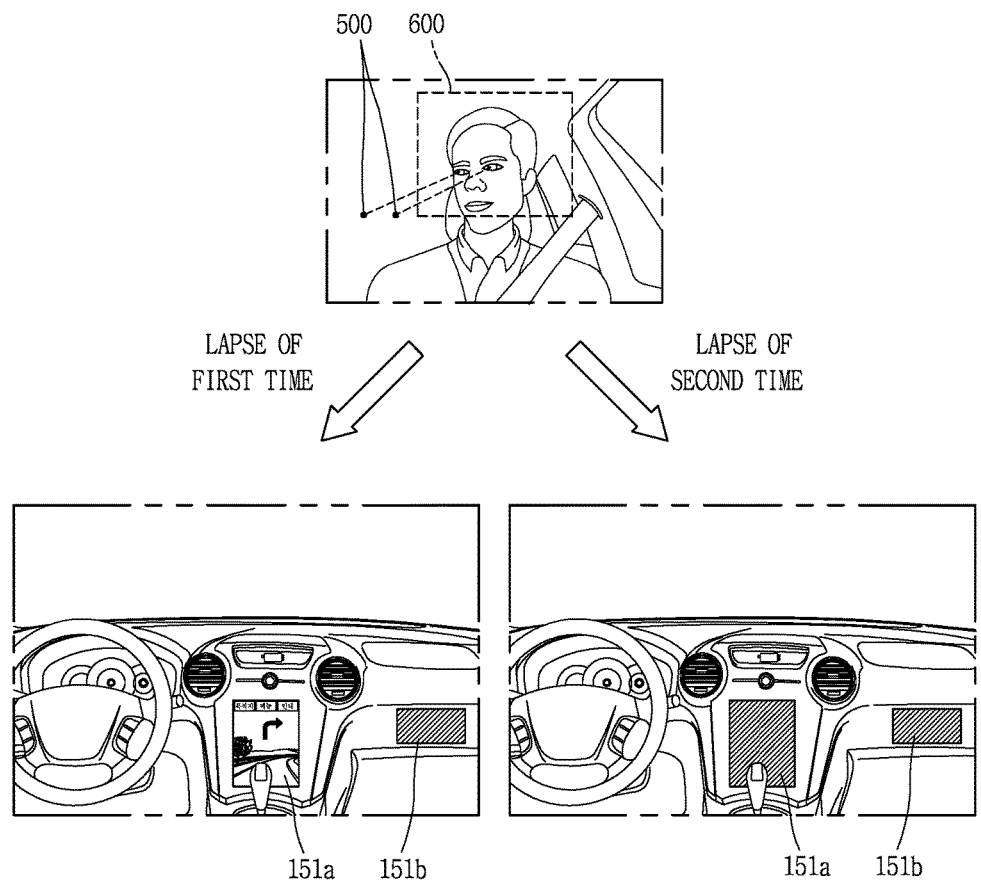
Figure 11C:
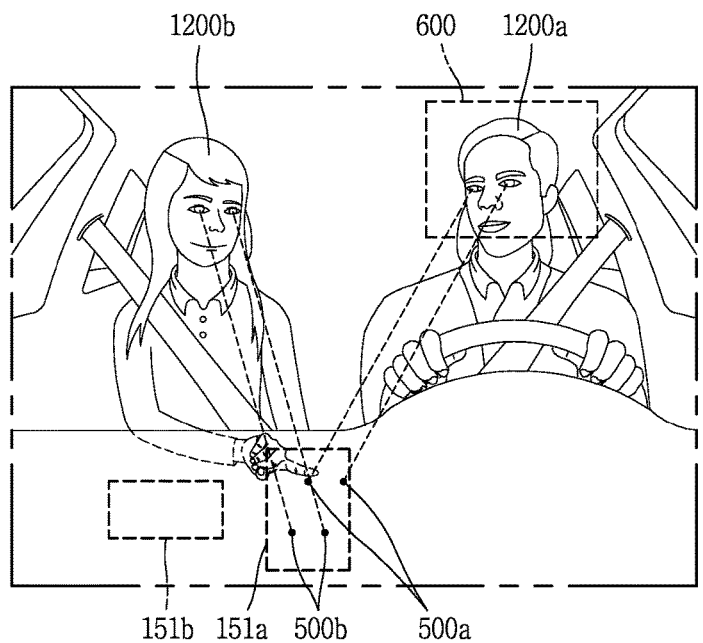
Figure 11C:
Figure 11C:
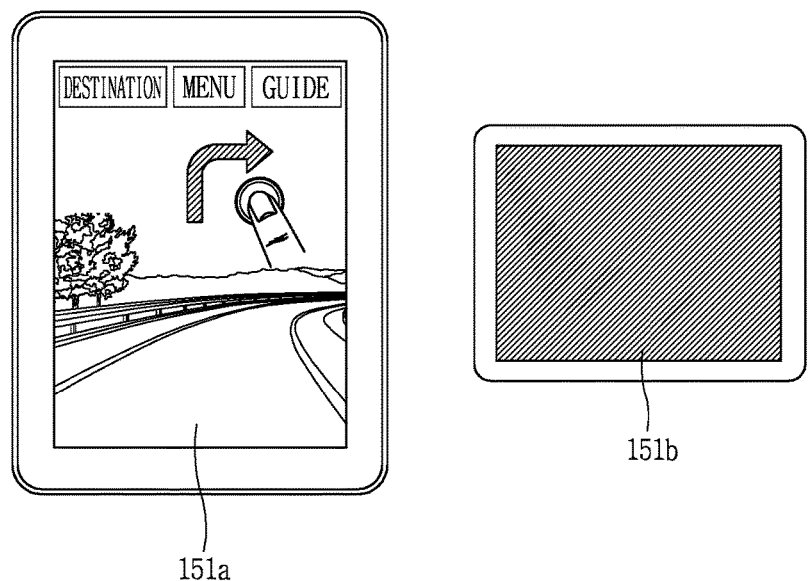

FIGS. 11A to 11C are conceptual views illustrating a control method when a plurality of touch screens are provided at an electronic device according to an embodiment of the present invention.

The electronic device according to the present invention may be provided with a plurality of touch screens. For instance, as shown in FIG. 11A, the electronic device according to the present invention may be provided with a first touch screen 151a and a second touch screen 151b different from the first touch screen 151a.

The same screen information based on the same data may be displayed on the first and second touch screens 151a, 151b, or different screen information may be displayed on the first and second touch screens 151a, 151b.

The controller 180 of the electronic device according to the present invention may control the plurality of touch screens in various manners, based on a driver's eyeline.

For instance, the controller 180 may detect a driver's eyeline using the camera 121, and may control screen information being output to the plurality of touch screens to disappear if the driver's eyeline 500 is out of the preset range 600 for more than a predetermined time.

The controlling screen information being output to the plurality of touch screens to disappear may include turning off the touch screen, entering a standby mode such that screen information is not output, outputting other screen information rather than the existing screen information (or converting the existing screen information into another screen information), etc.

The screen information being output to the plurality of touch screens may disappear based on lapse of a different time. More specifically, the controller 180 may control the screen information being output to the plurality of touch screens to disappear, based on a time duration for which the driver's eyeline 500 is out of the preset range 600.

Referring to FIG. 11B, the plurality of touch screens may include a first touch screen 151a and a second touch screen 151b different from the first touch screen 151a. In this specification, two touch screens (the first and second touch screens) are configured for convenience. However, the present invention is not limited to this.

As shown in FIG. 11B, a distance between a driver (or a driver's seat) and the first touch screen 151a may be shorter than a distance between the driver (or the driver's seat) and the second touch screen 151b. That is, the first touch screen 151a may be a touch screen disposed closer to the driver, than the second touch screen 151b.

In a state where screen information is being output to the first and second touch screens 151a, 151b, the controller 180 may sense the driver's eyeline 500 based on an image received through the camera 121. As a time duration for which the driver's eyeline 500 is out of the preset range 600 becomes longer, the controller 180 may control screen information being output to the touch screen farther from the driver among the plurality of touch screens, to disappear firstly.

For instance, as shown in FIG. 11B, if the driver's eyeline 500 is out of the preset range 600 for more than a first time, the controller 180 may control screen information being output to the second touch screen 151b to disappear. On the other hand, the controller 180 may control an output state of screen information being output to the first touch screen 151a to be maintained. The first time may be the same as the aforementioned predetermined time, or may be longer than the predetermined time.

If the driver's eyeline 500 is out of the preset range 600 for a second time longer than the first time, the controller 180 may control screen information being output to the first touch screen 151a as well as the screen information being output to the second touch screen 151b, to disappear. That is, the screen information being output to the first touch screen 151a may disappear if the driver's eyeline 500 is out of the preset range 600 for the second time longer than the first time. The first and second times may be set by a user. With such a configuration, a time duration for which a driver stares at a touch screen farther from the driver among a plurality of touch screens, is reduced. This may allow the driver to better concentrate on the driving.

As another example, as a time duration for which the driver's eyeline 500 is out of the preset range 600 becomes longer, the controller 180 may control screen information being output to the touch screen closer to the driver among the plurality of touch screens, to disappear firstly.

For instance, in a state where screen information has been output to the first and second touch screens 151a, 151b, if the driver's eyeline 500 is out of the preset range 600 for more than the first time, the controller 180 may control screen information being output to the first touch screen 151a closer to the driver than the second touch screen 151b, to disappear firstly. Then, the controller 180 may control screen information being output to the second touch screen 151b to disappear, if the driver's eyeline 500 is out of the preset range 600 for more than a second time longer than the first time.

For instance, if it is determined that a passenger rather than the driver (e.g., a passenger next to the driver) is staring (or touching) the second touch screen, the controller 180 may control screen information being output to the first touch screen 151a closer to the driver than the second touch screen 151b, to disappear firstly.

In a case where a plurality of touch screens are provided, whether to control screen information displayed on a touch screen farthest from a driver to disappear firstly, or to control screen information displayed on a touch screen closest to the driver to disappear firstly, may be determined by a user's setting or based on a preset condition.

If it is determined that a touch screen is being manipulated by a passenger rather than a driver (e.g., a passenger next to the driver), the controller 180 may control screen information being output to the touch screen, not to disappear.

Hereinafter, a driver may mean a person who drives the vehicles, and a user may mean a passenger sitting on a seat next to the driver.

More specifically, as shown in FIG. 11C, the camera 121 of the electronic device according to the present invention may be formed to further capture a user 1200b sitting next to a driver 1200a. The camera 121 may be a single camera, and may be configured to capture both the driver and the user. And the camera 121 may be formed to have a wide angle so as to capture both the driver and the user. The electronic device according to the present invention may be provided with a plurality of cameras for capturing the driver and a user (a passenger). In this case, the first camera may be disposed on the front side of a driver's seat, and the second camera may be disposed on the front side of a passenger's seat.

As shown in FIG. 11C, the controller 180 may determine whether the driver and/or the user (passenger) are manipulating a touch screen, based on an image received through the camera 121. More specifically, the controller 180 may distinguish the driver 1200a and the user 1200 from each other based on an image received through the camera 121. And the controller 180 may determine whether a touch screen is being manipulated or not, and which touch screen among a plurality of touch screens is being manipulated, based on at least one of a driver's eyeline 500a, a user's eyeline 500b, a driver's motion and a user's motion.

For instance, if it is determined that a user's eyeline not a driver's eyeline is toward one touch screen based on an image received through the camera, and if a sensed motion of the user corresponds to a preset motion (e, g., a motion to bend the body in order to apply a touch input, a motion to stretch an arm, etc.), the controller 180 may determine that the user rather than the driver is manipulating the one touch screen.

Such a distinguishment and determination are executed through image analysis and a preset algorithm, which has been well known to the public. Thus, detailed explanations thereof will be omitted.

If it is determined that the user not the driver is applying a touch input to one of a plurality of touch screens based on an image received through the camera, the controller 180 of the electronic device according to the present invention may control screen information being output to the one touch screen to be continuously output without disappearing.

For instance, as shown in FIG. 11C, if the eyeline 500a of the driver 1200a and the eyeline 500b of the user 1200b are out of preset ranges 600a, 600b for a predetermined time (e.g., a first time or a second time), screen information being output to at least one touch screen among a plurality of touch screens may disappear. In this case, if it is determined that the user 1200b is applying a touch input to one of the plurality of touch screens (e.g., the first touch screen 151a), the controller 180 may control screen information displayed on the one touch screen (e.g., the first touch screen 151a), not to disappear. In this case, the screen information being output to the at least one touch screen may be continuously output. In a state where the screen information being output to the at least one touch screen has disappeared (or in a state where the one touch screen has been turned off), if it is determined that a touch input is being applied to the one touch screen by the user not the driver, the controller 180 may re-output the screen information which has disappeared to the one touch screen (or may turn on the one touch screen).

The controller 180 may maintain an input function with respect to the one touch screen. More specifically, as shown in FIG. 11C, if it is determined that the user 1200b not the driver 1200a is manipulating the one touch screen 151a, even if the driver's eyeline is out of a preset range for more than a predetermined time, the controller 180 may maintain an input function.

Although not shown, the controller 180 may output notification information inducing the driver to look at the front side, to the one touch screen. Alternatively, the controller 180 may output a front image received through the camera disposed to be toward the front side, to the one touch screen.

Even if the user's eyeline 500b is out of the preset range 600b, if the driver's eyeline 500b is within the preset range 600a (that is, if the driver stares at the front side), the controller 180 may maintain screen information output to the plurality of touch screens, and may not restrict a touch input function.

With such a configuration, if it is determined that a user not a driver is manipulating a touch screen, a user interface is provided to induce the driver to stare at the front side without disturbing the user's manipulation.

Figure 12A:
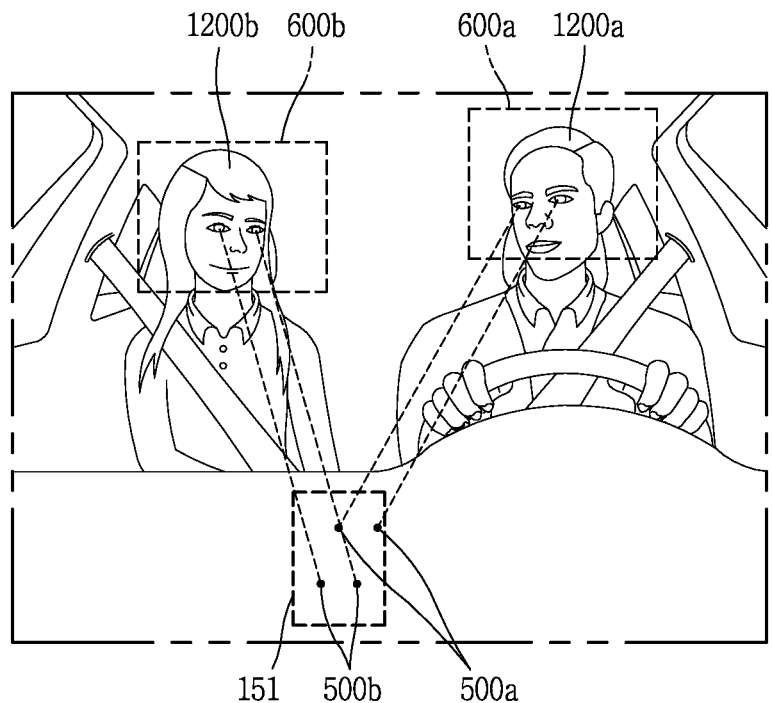
FIGS. 12A to 12C are conceptual views illustrating that a specific function is executed based on a plurality of users' eyelines, in an electronic device according to an embodiment of the present invention.
Figure 12A:
Figure 12A:
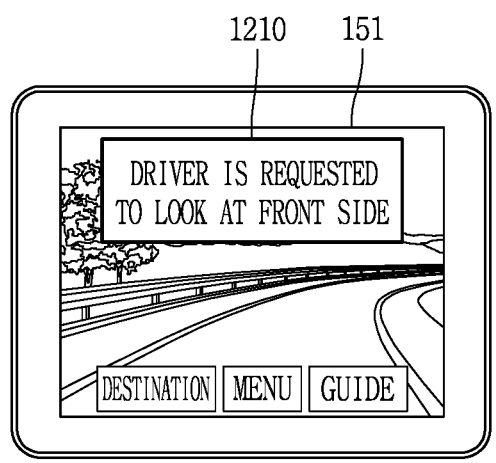
Figure 12B:
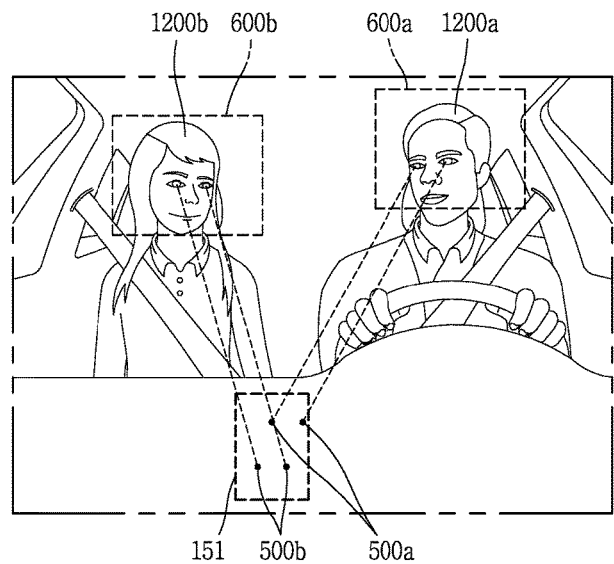
Figure 12C:
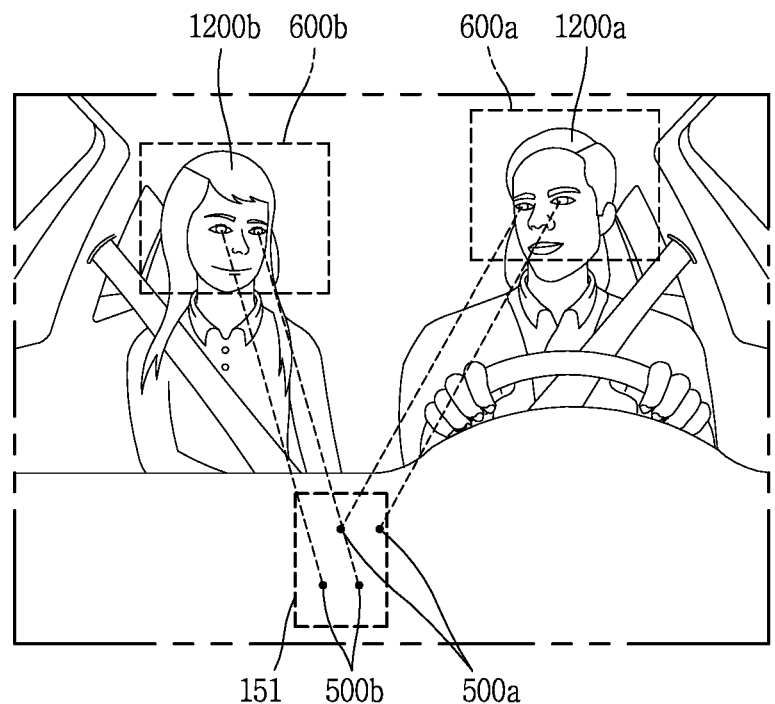
Figure 12C:
Figure 12C:
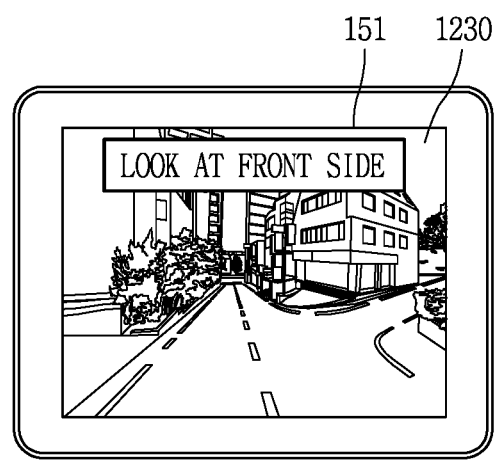

FIGS. 12A to 12C are conceptual views illustrating that a specific function is executed based on a plurality of users' eyelines, in an electronic device according to an embodiment of the present invention.

As aforementioned, the electronic device according to the present invention may include a camera configured to capture both a driver and a passenger.

The controller 180 may sense a driver's eyeline 500a and a user's eyeline 500b, based on an image received through the camera. More specifically, the controller 180 may detect the user's eyeline 500b as well as the driver's eyeline 500a, based on an image received through the camera. If it is determined that both the driver's eyeline 500a and the user's eyeline 500b are toward the touch screen 151 for more than a predetermined time, the controller 180 may control a specific function to be executed on the touch screen 151.

The context that both the driver's eyeline 500a and the user's eyeline 500b are toward the touch screen 151 for more than a predetermined time may mean that the driver's eyeline 500a and the user's eyeline 500b are out of preset ranges 600a, 600b (e.g., the front side), respectively, for more than a predetermined time.

The specific function may include various functions. For instance, the specific function may include various functions to induce the driver's eyeline to be toward the front side, and to induce the user to manipulate the touch screen.

For instance, as shown in FIG. 12A, if it is determined that both the driver's eyeline 500a and the user's eyeline 500b are toward the touch screen 151 for more than a predetermined time, notification information 1210 inducing the driver to stare at the preset range 600a (e.g., the front side) may be output to the touch screen 151.

As another example, as shown in FIG. 12B, if it is determined that both the driver's eyeline 500a and the user's eyeline 500b are toward the touch screen 151 for more than a predetermined time, the controller 180 may change an output type of screen information being output to the touch screen 151, such that the touch screen 151 may be manipulated by the user not the driver.

For instance, as shown in FIG. 12B, screen information 1220 may be output to the touch screen 151. In this case, if it is determined that both the driver's eyeline 500a and the user's eyeline 500b are toward the touch screen 151 for more than a predetermined time, the controller 180 may divide the touch screen 151 into at least two regions 1222a, 1222b, and may change an output state of the screen information 1220 such that the output screen information 1220 may be output to one of the at least two regions.

The one region may be a region close to a passenger's seat. For instance, when the passenger's seat is on the right, the one region may be the right region 1222b between the right and left regions. In this case, notification information inducing the driver to stare at the front side may be displayed on the left region 1222a, or an image received through the camera disposed to be toward the front side may be output to the left region 1222a.

The controller 180 may maintain an input function (e.g., a touch input function) with respect to the right region 1222b where an output type of the screen information 1220 is changed, and may restrict an input function with respect to the left region 1222a.

If it is determined that the driver's eyeline 500a stares at the preset range 600a, the controller 180 may restore the screen information 1220 having its output type changed, into the original state. Then, the controller 180 may output the restored screen information 1220 to the touch screen 151.

As another example, as shown in FIG. 12C, if it is determined that both the driver's eyeline 500a and the user's eyeline 500b are toward the touch screen 151 for more than a predetermined time, the controller 180 may output, to the touch screen 151, an image 1230 received through the camera disposed to be toward the front side, or warning information (a warning message) inducing the driver to stare at the front side. Although not shown, the image 1230 received through the camera disposed to be toward the front side may be output to part of the touch screen 151, such that the user's viewing may not be disturbed.

The notification information output to the touch screen 151 may be output in the form of an alarm through a speaker, or in the form of vibrations applied to the driver's seat or a handle.

With such a configuration, provided is a user interface to induce the driver to stare at the front side without disturbing the user's viewing. This may enhance user's convenience, and may allow the driver to drive the vehicle safely.

FIG. 13 is a conceptual view illustrating a method of restricting selection of menu items having different depths, in an electronic device according to an embodiment of the present invention.

A plurality of selectable menu items 1300a, 1300b, 1300c (graphic objects, icons, buttons, images, etc.) may be output to the touch screen 151 of the electronic device according to the present invention. Each of the plurality of menu items may be formed to have a preset depth.

The depth may mean the number of times that touch inputs are applied in order to execute a function related to a corresponding menu item. For instance, a menu item having a first depth (a first depth menu) may be an item requiring a single touch input so as to execute a related function, or so as to output screen information for controlling a related function to the touch screen. As another example, a menu item having a second depth (a second depth menu) may be an item requiring at least two touch inputs so as to execute a specific function, or so as to output screen information for executing a specific function to the touch screen. A menu item having more than second depth may have a sub menu item.

Such a depth may be defined based on the number of hierarchies related to a sub menu item of the menu item.

A menu item having a higher depth requires more touch inputs for executing a desired function. Accordingly, if the driver is to execute a desired function through a menu item having a high depth, time for which the driver does not stare at the front side may be increased.

As shown in FIG. 13, as a time duration for which the driver's eyeline is out of a preset range (the front side) is increased, the controller 180 may sequentially restrict selection for menu items in order of a menu item having a larger depth.

For instance, as shown in FIG. 13, a plurality of menu items displayed on the touch screen 151 may include a menu item 1300a having a first depth, a menu item 1300b having a second depth, and a menu item 1300c having a third depth.

As a time duration for which the driver's eyeline is out of a preset range (the front side) is increased, the controller 180 may sequentially restrict selection for menu items in order of a menu item having a larger depth. The restriction may mean deactivating a corresponding menu item such that the menu item cannot be selected.

For instance, if the driver's eyeline is out of a preset range for more than a first time, the controller 180 may restrict selection for the menu item 1300c having a third depth (largest depth) among the menu items having 1-3 depths. Then, if the driver's eyeline is out of the preset range for more than a second time longer than the first time, the controller 180 may restrict selection for the menu item 1300b having a second depth. Then, if the driver's eyeline is out of the preset range for more than a third time longer than the second time, the controller 180 may restrict selection for the menu item 1300a having a first depth.

In this case, the controller 180 may output notification information inducing the driver to stare at the front side to at least part of the touch screen, if the driver's eyeline is out of the preset range for at least one of the first to third times.

Although not shown, if it is determined that the driver's eyeline is out of a preset range even after selection for a menu item having a smallest depth is restricted (e.g., if the driver's eyeline is out of the preset range for a time longer than the third time), the controller 180 may turn off the touch screen. Or, the controller 180 may control screen information being output to the touch screen to disappear, or may output an image received through the camera formed to be toward the front side to the touch screen 151.

With such a configuration, the present invention may provide a control method for restricting selection (a touch input) such that a driver stares at the front side more rapidly when the driver wishes to execute a specific function through a menu while driving.

FIG. 14 is a conceptual view illustrating that an input to the touch screen is restricted according to another embodiment of the present invention.

As aforementioned, the controller 180 of the electronic device according to the present invention may restrict an input function with respect to the touch screen, if the driver's eyeline is out of a preset range (the front side) for more than a predetermined time. The controller 180 may restrict an input function with respect to the touch screen in various manners.

For instance, as aforementioned, the controller 180 may immediately restrict an input function with respect to the touch screen, if the driver's eyeline is out of a preset range (the front side) for more than a predetermined time.

As another example, as shown in FIG. 14, if the driver's eyeline 500 is out of the preset range 600 for more than a predetermined time, the controller 180 may not immediately restrict an input function with respect to the touch screen, but may output, to the touch screen 151, notification information 1400 for counting-down remaining time before the input function with respect to the touch screen is restricted.

Then, the controller 180 may restrict an input function with respect to the touch screen, as the remaining time lapses. That is, the input function with respect to the touch screen 151 may be restricted as the remaining time counted-down lapses. While the count-down is performed, an input to the touch screen 151 may be executed.

The notification information 1400 for counting-down remaining time may be output to part of the touch screen 151 such that screen information being output may be touched (selected).

If the driver's eyeline is still out of the preset range after a touch input to the touch screen 151 is restricted (i.e., if the driver continues to stare at the touch screen), the controller 180 may output, to the touch screen 151, at least one of notification information 1410 indicating restriction of an input function, and an image 1420 received through the camera formed to be toward the front side.

If the driver's eyeline is still out of the preset range after a touch input to the touch screen 151 is restricted (i.e., if the driver continues to stare at the touch screen), the controller 180 may output warning information (a warning message) inducing the driver to stare at the front side. The warning information may be output to the touch screen 151, or may be output through a speaker in the form of an alarm. Alternatively, the alarm information may be output in the form of vibrations applied to a driver's seat or a handle.

With such a configuration, the present invention may provide a user interface to rapidly select a menu item having a small depth (e.g., a menu item having a first depth, etc.) and to induce a driver's eyeline to be toward the front side, before a touch input to a touch screen is restricted.

The present invention may have the following advantages.

Firstly, a driver's eyeline is detected while a vehicle is running, and screen information output to a touch screen is converted or a touch input to the touch screen is restricted, if the driver's eyeline is out of a preset range for more than a predetermined time as the driver applies a touch input to the touch screen. With such a configuration, the driver's eyeline may be induced to be toward the front side, while at least part of the screen information output to the electronic device is maintained.

Secondly, if the driver's eyeline is out of a preset range for more than a predetermined time (i.e., if the driver stares at the touch screen for more than a predetermined time), the touch screen may be turned off, or an image received through a camera formed to be toward the front side may be output to the touch screen. This may induce the driver to stare at the front side, resulting in lowering an accident rate.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The invention claimed is:

1. An electronic device provided in a vehicle, the electronic device comprising:
   a touch screen;
   a first camera configured to capture an image of a driver of the vehicle; and
   a controller configured to:
   restrict a touch input to at least a portion of the touch screen in response to the vehicle being driven and an eyeline of the driver included in the image being out of a preset driving range for more than a first predetermined time,
   restrict the touch input to all of the touch screen in response to the eyeline of the driver being out of the preset driving range for more than a second predetermined time greater than the first predetermined time, and
   turn off the touch screen in response to the eyeline of the driver being out of the preset range for more than a third predetermined time greater than the second predetermined time.

2. The electronic device of claim 1, wherein the controller is further configured to:
   restrict a touch input function of the touch screen in response to the vehicle being driven and the eyeline of the driver being out of the preset driving range for more than the first predetermined time, and
   not restrict the input function of the touch screen in response to the vehicle not being driven and the eyeline of the driver being out of the preset range for more than the first predetermined time.

3. The electronic device of claim 2, wherein the first, second and third predetermined time corresponds to a time duration for which the eyeline of the driver is out of the preset driving range from a time point when the touch input has been applied to the touch screen.

4. The electronic device of claim 2, wherein the controller is further configured to output notification information for counting-down a remaining time before the touch input function with respect to the touch screen is restricted in response to the eyeline of the driver being out of the preset driving range for more than the first predetermined time.

5. The electronic device of claim 1, wherein the controller is further configured to output voice or display information on the touch screen indicating a separate user input from the touch screen to be used to input information.

6. The electronic device of claim 1, wherein the at least the portion of the touch screen being restricted corresponds to video viewing features provided by the electronic device.

7. The electronic device of claim 1, wherein the controller is further configured to output a notification indicating the touch input to all of the touch screen is restricted in response to the driver's eyeline being out of the preset driving range for the second predetermined time.

8. The electronic device of claim 1, further comprising:
   a second camera facing toward a front side of the vehicle,
   wherein the controller is further configured not to turn off the touch screen, and to display an image received through the second camera in response to the eyeline of the driver being out of the preset driving range for more than the third predetermined time.

9. The electronic device of claim 1, further comprising:
   a display located a different position from the touch screen,
   wherein the controller is further configured to switch displaying screen information on the touch screen to the display in response to the eyeline of the driver being out of the preset driving range for more than the first predetermined time.

10. The electronic device of claim 1, wherein the controller is further configured to turn off the touch screen in response to the eyeline of the driver being toward the touch screen for more than the third predetermined time and when the vehicle is being driven.

11. The electronic device of claim 1, wherein the touch screen includes a plurality of touch screens, and
wherein the controller is further configured to stop displaying screen information on the plurality of touch screens at different time lapses in response to the eyeline of the driver being out of the preset driving range for more than a predetermined time.

12. The electronic device of claim 11, wherein the plurality of touch screens include a first touch screen, and a second touch screen different from the first touch screen,
wherein a distance between the driver and the first touch screen is shorter than a distance between the driver and the second touch screen,
wherein the controller is further configured to stop displaying screen information being displayed on the second touch screen and maintain screen information being displayed on the first touch screen in response to the eyeline of the driver being out of the preset driving range for more than the first predetermined time, and
wherein the controller is further configured to stop displaying screen information being displayed on the first touch screen in response to the eyeline of the driver being out of the preset driving range for more than the second predetermined time.

13. The electronic device of claim 11, wherein the first camera is configured to capture an image of a passenger in the vehicle, and
wherein the controller is further configured to maintain displaying screen information on one touch screen among the plurality of touch screens in response to the passenger applying a touch input to the one touch screen, based on the image of the passenger.

14. The electronic device of claim 13, wherein the controller is further configured to maintain an input function with respect to the one touch screen without being restricted.

15. The electronic device of claim 1, wherein the first camera is configured to capture an image of a passenger in the vehicle, and
wherein the controller is further configured to output a notification requesting the driver look forward towards a driving direction in response to an eyeline of the passenger and the eyeline of the driver being toward the touch screen for more than a predetermined time.

16. The electronic device of claim 1, wherein the first camera is configured to capture an image of a passenger in the vehicle, and
wherein the controller is further configured to split the touch screen into a first screen and second screen and display screen information previously displayed on the touch screen in the first screen, and display a notification in the second screen requesting the driver look forward towards a driving direction in response to an eyeline of the passenger and the eyeline of the driver being toward the touch screen for more than a predetermined time.

17. The electronic device of claim 1, wherein the controller is further configured to display a plurality of selectable menu items on the touch screen, each of the plurality of menu items having a preset depth, and
wherein as a time duration for which the eyeline of the driver is out of the preset driving range is increased, the controller is further configured to sequentially restrict selection for menu items in an order of a menu item having a larger depth.

18. A method of controlling an electronic device provided in a vehicle, the method comprising:
capturing, via a first camera, an image of a driver of the vehicle; and
restricting, via a controller, a touch input to at least a portion of the vehicle being driven and a touch screen in response to an eyeline of the driver included in the image being out of a preset driving range for more than a first predetermined time,
restricting, via the controller, the touch input to all of the touch screen in response to the eyeline of the driver being out of the preset range for more than a second predetermined time greater than the first predetermined time; and
turning off, via the controller, the touch screen in response to the eyeline of the driver being out of the preset range for more than a third predetermined time greater than the second predetermined time.

19. An electronic device provided in a vehicle, the electronic device comprising:
a touch screen;
a first camera configured to capture an image of a driver of the vehicle;
a second camera facing toward a front side of the vehicle; and
a controller configured to:
restrict a touch input to at least a portion of the touch screen in response to an eyeline of the driver included in the image being out of a preset driving range for more than a first predetermined time,
restrict the touch input to all of the touch screen in response to the eyeline of the driver towards the camera being out of the preset range for more than a second predetermined time greater than the first predetermined time, and
display an image received through the second camera in response to the eyeline of the driver being out of the preset driving range for more than a third predetermined time greater than the second predetermined time.

* * * * *